(12) United States Patent
Hiraguchi et al.

(10) Patent No.: US 7,165,738 B2
(45) Date of Patent: Jan. 23, 2007

(54) RECORD MEDIA CARTRIDGE

(75) Inventors: Kazuo Hiraguchi, Kanagawa (JP); Wataru Iino, Kanagawa (JP); Shozo Onmori, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/082,136

(22) Filed: Feb. 26, 2002

(65) Prior Publication Data
US 2002/0141087 A1 Oct. 3, 2002

(30) Foreign Application Priority Data
Feb. 26, 2001 (JP) ............................. 2001-050074

(51) Int. Cl.
*G11B 23/087* (2006.01)
(52) U.S. Cl. ................................... 242/345.2
(58) Field of Classification Search ............. 242/345.2, 242/338.3, 343; 360/92, 93, 96.1, 132
See application file for complete search history.

(56) References Cited

U.S. PATENT DOCUMENTS

| | | | | | |
|---|---|---|---|---|---|
| 3,801,042 | A | * | 4/1974 | Dobson | 242/343 |
| 3,934,839 | A | * | 1/1976 | Serizawa | 242/342 |
| 4,290,567 | A | * | 9/1981 | Saito | 242/343.1 |
| 4,408,733 | A | * | 10/1983 | Ooishi et al. | 242/338.3 |
| 4,496,118 | A | * | 1/1985 | Oishi et al. | 242/345.2 |
| 4,569,492 | A | * | 2/1986 | Gelardi et al. | 242/343.1 |
| 4,629,144 | A | * | 12/1986 | Schoettle | 242/345.2 |
| 4,717,091 | A | * | 1/1988 | Schoettle et al. | 242/345.2 |
| 4,986,491 | A | * | 1/1991 | Gelardi et al. | 242/345.2 |
| 6,471,151 | B1 | * | 10/2002 | Kita et al. | 242/345.2 |

FOREIGN PATENT DOCUMENTS

WO WO 200025315 A1 * 5/2000

* cited by examiner

*Primary Examiner*—Kathy Matecki
*Assistant Examiner*—Scott Haugland
(74) *Attorney, Agent, or Firm*—Sughrue Mion, PLLC

(57) ABSTRACT

In this recording media cartridge, a reel around which a recording medium is wound is rotatably received within a case body constituted by coupling upper and lower halves in a face-to-face relationship, the reel is urged toward the lower half by a planar reel presser spring supported on an inner surface of the upper half as in a cantilever, and the reel presser spring is detachably mounted on the inner surface of the upper half, so that the reel presser spring can be collected without damaging components of the cartridge such as the case body, the reel presser spring and a reel lock member. As a result, in this cartridge, the waste materials can be reduced and the impact on the environment can be reduced. The cartridge is effective when different materials are sorted, and the disassembling work can be simplified.

9 Claims, 13 Drawing Sheets

RECORD MEDIA CARTRIDGE

BACKGROUND OF THE INVENTION

1. Technical Field of the Invention

The present invention relates to a recording media cartridge such as a magnetic tape cassette or a digital video cassette (DVC), and more particularly to a recording media cartridge which facilitates attachment or detachment of a reel urging leaf spring for urging reels, i.e., a planar reel presser spring and which enables reduction of the impact on the environment.

2. Prior Art

Up to now, recording media cartridges used as video recording media for personal use or office use or as recording media used in external storage devices of computers or the like are categorized roughly into those using magnetic discs or magnetooptical discs as recording media (magnetic or magnetooptical disc cartridges or the like) and those using magnetic tape (magnetic tape cartridges).

Incidentally, as the latter magnetic tape cartridges, there are recording/reproducing tape cassettes used in video tape recorders or video cameras for personal use or office use and magnetic tape cassettes or magnetic tape cartridges used as large capacity recording media for data backup in external storage devices of computers or the like.

Also, as types of the magnetic tape cartridges, there are those formed by winding a magnetic tape around a single reel (so-called one-reel type magnetic tape cartridge) or those formed by winding a magnetic tape between two reels (so-called two-reel type magnetic tape cartridge or cassette). For instance, magnetic tape cassettes or the like with structures and dimensional specifications stipulated in JIS X6127, X6129, X6130, X6171, X6172 or ECMA-288 or the like are known.

The recording media cartridges such as these magnetic or magnetooptical disc cartridges or magnetic tape cartridges or magnetic tape cassettes are used for recording/reproducing or data storage in computers or the like, and precious images or sounds and/or important information are stored. Accordingly, these cartridges are structured so as to avoid damages to magnetic or magnetooptical discs, to avoid jamming of the magnetic tape, or to avoid the accidental drawing-out of the magnetic tape. For this reason, these various recording media cartridges are structured as composite structures obtained by combining various metal members and synthetic resin members according to the performance and shape required for each component for the structures.

A two-reel type magnetic tape cassette in which a magnetic recording tape wound around a pair of tape reels is held in a case body so as to be traveled for recording/reproducing will now be specifically described as an example of a recording media cartridge.

FIG. 33 is an exploded perspective view showing a structure of the above-described DVC as an example of this type magnetic tape cassette. As shown in FIG. 33, an upper half 20 and a lower half 22, each of which has a bottom plate and a peripheral wall, are assembled and fastened by screws 21 or the like and coupled in a face-to-face relationship to form a cassette case body (hereinafter simply referred to as a body case) 11 of this magnetic tape cassette 10. A pair of tape reels 24, 24 on a feeding side and a takeup side around which a magnetic tape 26 is wound are received between the upper half 20 and the lower half 22 of this body case 11.

Here, the tape reels 24, 24 are composed of a pair of reel hubs 24a, 24a around which the magnetic tape 26 is wound and upper flanges 24b, 24b and lower flanges 24c, 24c welded to upper and lower portions thereof and are received in the body case 11 to be rotatable.

Also, the tape reels 24, 24 are prevented from moving in their planar direction by a plurality of retaining ribs implanted in a bottom plate 22a of the lower half 22 so as to be in conformity with the outer circumferences thereof. Also, an opening is formed in the bottom plate of the upper half 20 so that the winding amount of the magnetic tape 26 around the tape reels 24, 24 can be confirmed. A transparent window (visible window) 20a is provided so as to cover this opening.

Also, a pair of metal-made reel urging leaf springs (hereinafter referred to as reel presser springs) 38, 38 are provided in an inner surface (a lower surface in the drawing) of the upper half 20, in correspondence with the respective tape reels 24, 24. The respective reel presser springs 38, 38 are fixed as in a cantilever on the inner surface of the upper half 20 and adapted to urge the corresponding tape reels 24, 24 toward the side of the lower half 22, respectively.

Here, the reel presser springs 38, 38 sufficiently urge the tape reels 24, 24 toward the lower half and also are firmly mounted directly or through a member onto the inner surface of the upper half by welding such as ultrasonic welding or thermal welding, caulking, adhesion or another method not so as to move away from a predetermined position during the use of the cassette or the like thus impeding the function and operation of other components or members in the cassette box. For example, as shown in FIG. 34, the reel presser spring 38 has been conventionally firmly fixed by passing a projection 20e provided on an inner surface 20b of the bottom surface of the upper half 20 through an anchor hole 38c formed in a support portion 38b curvedly followed by an elastic portion (urging end portion) 38a for urging the tape reel, and by deforming the projection 20e projecting from the anchor hole 38c by welding such as ultrasonic welding or thermal welding, caulking or another method thereby forming a wider welded portion 20f than the anchor hole 38c.

A front cover (lid) 35 for covering and protecting a front surface and a back surface of the magnetic tape 26 to be tensioned between a pair of tape guides 46, 46 of the lower half 22 (described later) when this magnetic tape cassette 10 is not used is provided on the front surface (left side in the drawing) of the upper half 20 to obtain dust-proof property. As described later, this lid 35 is composed of three components, i.e., an outer lid 30, an upper lid 32 and an inner lid 34, which are mounted so as to freely open or close an opening portion 28 of the magnetic tape cassette 10, respectively.

The lower half 22 has a rectangular bottom plate 22a. The bottom plate 22a has reel shaft insertion holes 22b, 22b for rotatably supporting the pair of tape reels 24, 24 around which the magnetic tape 26 is wound and through which reel shafts (not shown) are inserted from a recording/reproducing device into the tape reels 24, 24 for their rotational driving when the magnetic tape cassette is loaded in the recording/reproducing device.

Also, the bottom plate 22a of the lower half 22 has a pair of projections 40, 40 extending forwardly from the left and right ends. The space between these projections 40, 40 is a space where the bottom plate 22a of the lower half 22 is not present to form the above-described opening portion 28 of the body case 11. Also, cylindrical tape guides 46, 46 for guiding the magnetic tape 26 tensioned between the pair of tape reels 24, 24 through a predetermined path to the front surface of the body case 11 are vertically implanted in the projections 40, 40 from the bottom plate 22a on both sides of the opening portion 28 of the front end side (front side in the drawing) of the lower half 22. That is, the respective tape guides 46, 46 are adapted to guide the magnetic tape 26 fed from one of the tape reels 24 and wound around the other of the tape reels 24 and cause the magnetic tape 26 to pass at a predetermined position of the opening portion 28.

Also, a tape reel lock member (hereinafter simply referred to as a reel lock member) 36 having tape reel anchor arms 36a and a slide drum portion 36b is assembled on the rear end side (on the deep side of the drawing) of the lower half 22. Here, the slide drum portion 36b is nipped slidably by means of a pair of guide ribs 43, 43 implanted in the bottom plate 22a of the lower half 22. This reel lock member 36 is urged by means of a metal-made compression coil spring (hereinafter referred to as a reel lock spring) 42 so that the tape reel anchor arms 36a are engaged with engagement teeth 24d, 24d formed on the outer circumferences of the lower flanges 24c, 24c of the respective tape reels 24, 24 to thereby prevent the accidental rotation of the respective tape reels 24, 24. Thus, the winding of the magnetic tape 26 is prevented from loosening.

Among the outer lid 30, the upper lid 32 and the inner lid 34 of the lid 35 mounted on the above-described upper half 20, lock pins 48 are provided to project on the inner side of the side plates of the outer lid 30 having the flat plate portion and the side plates. Then, lid lock members 44 for locking the lock pins 48 of the closed outer lid 30 are mounted rotatably on the side wall portions 22c that are parts of the circumferential wall of the lower half 22. The lid lock members 44 are urged toward a direction in which the above-described lock pins 48 are locked by means of lid lock springs 50 to be mounted on the lower half 22 in the same manner.

Also, an erroneous erasing preventing plug 52 for preventing the erroneous erasing of the data recorded onto the magnetic tape 26 is mounted on the lower half 22. The erroneous erasing preventing plug 52 has a claw portion projecting on one side surface (side surface on the deep side of the drawing) thereof. When the plug is mounted within the lower half 22, the claw portion is adapted to be exposed to the outside through an opening formed in the circumferential wall of the upper half 20.

Then, by operating this claw portion from the outside, it is possible to move the erroneous erasing preventing plug 52 along the guide rib implanted in the bottom plate 22a of the lower half 22. It is possible to close or open a detection hole provided in the bottom plate of the lower half 22 with the bottom surface of this erroneous erasing preventing plug 52. The equipment such as a recording device reads out the condition of this detection hole and determines whether new data may be input on the magnetic tape 26.

The above-described upper and lower halves 20, 22, outer lid 30, upper lid 32, inner lid 34, upper and lower flanges of the tape reels 24, 24 and the like are made of synthetic resin materials and are injection molded, respectively. Also, in addition to these, members injection molded are suitably used in the magnetic tape cassette.

On the other hand, the reel presser springs 38, 38, the reel lock spring 42 and the like are generally made of metal materials.

By the way, recently, as a concern in the environmental issue has been increased, the attention is paid increasingly to the effect on the environment due to the increase of various kinds of waste materials such as plastics and composite materials. It becomes important to reduce the impact on the environment, i.e., to reduce the waste materials, not to cause the air, water and soil pollution even if the materials are wasted, or not to cause the hindrance against the environmental protection. For this reason, also with respect to the industrial products, there is a demand for a structure that may be taken into the recycle use system.

For example, in the above-described magnetic tape cassette, it is general that the metal-made, planar reel presser spring that is seen through the transparent window provided in its body case is conventionally provided to the back surface of the upper half by welding such as ultrasonic welding or thermal welding, caulking, or by using adhesives (or screws) as described above. Also, the magnetic tape made from a material different from that of the body case is wound around the reels also made from a different material and received in the interior of the magnetic tape cassette.

The reel presser spring thus mounted performs its function sufficiently in the conventional magnetic tape cassette. In order to detach the reel presser spring upon dismounting of the magnetic tape cassette, however, it is difficult to detach the spring from the mounting portion. If the spring is to be forcibly detached, there arises a problem in that other parts such as an upper half would be damaged and parts could not be used in a recycle manner.

That is, as described above, according to the method of fixing the reel presser spring to the back surface of the upper half by welding, caulking, adhesion or the like, there is a problem in that, in order to remove the reel presser spring, a part (welded portion 20f in the example shown in FIG. 34) of the back surface of the upper half would be damaged and in this case, the broken pieces would be scattered to injury an operator or a part of the back surface of the resin forming the upper half is left on the reel presser spring side so that the desired sorting could not be performed. (Also, there is a problem in that it is time-consuming to remove the reel presser spring according to the method of fixing this reel presser spring to the back surface of the upper half by screws.)

Also, as described above, the reel lock member is received slidably within the interior of the magnetic tape cassette and the metal-made reel lock spring is received within the interior of the reel lock member. For this reason, in order to remove the metal-made reel lock spring, it is necessary to dismount the magnetic tape cassette, to remove the reel lock member from the magnetic tape cassette and to remove the spring from the removed resin made reel lock member. There is a problem in that it is troublesome to remove the spring.

Thus, it is difficult to perform the disassembly under the condition that the metal-made reel presser spring is not separated from the upper half but is fixed to the upper half as it is. Also, even if the used magnetic tape cassette may be disassembled, it is difficult to separate and sort the respective elements such as the metal-made reel presser spring, the reel lock spring, the resin made reel lock member, the magnetic tape, the upper and lower halves or the transparent window and to recycle these elements. For these reasons, there is a problem in that a large amount of waste synthetic resin materials are generated and the wasted synthetic resins cause the considerable impact on the environment. Also, not only in the case of the used materials but also in the case of the rejected products from the manufacturing process of the magnetic tape cassette, it is also difficult to recycle or disassemble the rejected products in the same manner. Also, it is effective to reduce the manufacturing cost of the magnetic tape cassette by recycling the parts made of expensive materials. However, in view of the above-described current situation, there is a problem in that it is also difficult to recycle the parts.

Accordingly, a primary object of the present invention is to provide a recording media cartridge having a novel structure which may simplify the disassembling work and which is advantageous when different materials are sorted in a case body (body case) of a recording media cartridge such as a magnetic tape cassette for eliminating the problems inherent in the above-described prior art, reducing the amount of waste materials and reducing the impact on the environment, more specifically, a structure that may dispense with welding, caulking or adhesion for fixing to an inner surface of an upper half a planar reel presser spring for urging reels around which a recording medium such as a magnetic tape is wound, and furthermore, a structure which can facilitate removal of a reel lock spring for preventing an accidental rotation of the reels and loosening of the magnetic medium wound.

More specifically, a first object of the present invention is to provide a recording media cartridge that may meet the following requirements:

i) to sufficiently perform the function that is required for the reel presser spring;

ii) to readily detach the reel presser spring from the upper half by one operation in a recyclable form without deformation upon the disassembling work of the magnetic media cartridge;

iii) to provide a superior assembling property when assembling, to readily perform the separation between synthetic resin and metal upon wasting, and even in case of wasting, to reduce the number of the wasted parts and not to cause the impact on the environment after disassembling; and iv) to readily disassemble and collect the reel presser spring by one operation in a recyclable condition without damage or deformation and without damaging other structural parts such as a case body at the time when the magnetic media cartridge is to be disassembled in order to recycle the respective parts or members by disassembling the rejected products from the manufacturing process.

Also, more specifically, a second object of the present invention is to provide a recording media cartridge which may dispense with the conventional methods of fixing the reel presser spring to the upper half as exemplified by welding, caulking and adhesion, of which the spring can be assembled or disassembled with an efficiency as high as or higher than that in the conventional fixing methods even if a new anchor system is adopted, and of which the basic performance is not adversely affected by the change of the fixing method of the reel presser spring.

Also, more specifically, a third object of the present invention is to provide a recording media cartridge which, in the case where a structure is adopted where the reel presser spring may readily be assembled and removed, may assemble the spring with an efficiency as high as or higher than that in the conventional structure and of which the basic performance is not adversely affected by the change of the structure of the reel presser spring.

Also, more specifically, a fourth object of the present invention is to provide a recording media cartridge in which a reel presser spring may readily be removed to the outside without disassembling the case body and which is advantageous for separating and collecting the resin material and the metal material.

Also, more specifically, a fifth object of the present invention is to provide a recording media cartridge which, in the case where a structure is adopted where the reel lock spring may readily be removed, may assemble the spring with an efficiency as high as or higher than that in the conventional structure and of which the basic performance is adversely affected by the change of the structure of the reel presser spring.

BRIEF SUMMARY OF THE INVENTION

In order to attain the above-described main object and the first to fifth specific objects, the present inventors have studied intensively to reduce the waste materials, i.e., to reduce the impact on the environment of a recording media cartridge such as a magnetic tape cassette having the above-described conventional structure, and as a result have found out various methods. Also, the present inventors have found out that a structure which is advantageous for sorting different materials and enables simplification of the disassembling operation in a case body of a magnetic tape cassette, specifically, a structure which may dispense with the conventional methods of fixing a reel presser spring to a back surface of an upper half as exemplified by welding such as ultrasonic welding or thermal welding, caulking and adhesion (or dispense with screws), and which further facilitates the removal of a reel lock spring can be proposed as an example, and have also found out that the following points are to be considered in this case.

That is, it is to be considered here that a reel presser spring in a new anchoring method can be preferably assembled or disassembled with an efficiency as high as or higher than that in the case where the reel presser spring is coupled with the back surface of the upper half according to the conventional fixing method such as welding. It is also necessary to obtain mechanical strength and shape stability (without generation of twist or warpage) as high as or higher than those in the case of using the conventional fixing method such as welding. Furthermore, the most important point is that the change of the coupling method no longer adversely affects the basic performance of the magnetic tape cassette.

It is also to be considered that assembling with an efficiency as high as or higher than that in a magnetic tape cassette having a conventional structure is required. It is also necessary to cause no reduction of the strength and shape stability (cause no twist or warpage) by a mechanism by which the reel presser spring can be readily assembled or removed or the reel presser spring can be readily removed. Furthermore, the most important point is that the change of the mounting structure of this reel presser spring or the structure of the reel anchor spring receiving portion no longer adversely affects the basic performance of the magnetic tape cassette.

As a result, the present inventors have obtained the above-described knowledge and made the present invention.

Therefore, in order to achieve the above main object and the first and the second objects, according to a first aspect of the present invention, there is provided a recording media cartridge comprising a case body provided with an upper half and a lower half coupled with each other in a face-to-face relationship, a reel which is rotatably received in this case body and around which a recording medium is wound, and a planar reel presser spring supported on an inner surface of said upper half in a cantilever-like manner for urging said reel toward said lower half, wherein said reel presser spring is detachably mounted on the inner surface of said upper half so that said reel presser spring can be collected without damaging said case body, said reel presser spring and components of said recording media cartridge.

In this case, especially, in order to achieve the first object, it is preferable that said reel presser spring, said case body and the components of said recording media cartridge can be disassembled without any damage and said reel presser spring is collected to be reused.

In this case, it is also preferable that said reel presser spring has a cantilever support portion formed to have a U-shaped cross section, that a tip end of a clamping piece portion of the cantilever support portion is inserted between a pair of ribs implanted on the inner surface of said upper half, and that convex portions formed in one of said clamping piece portion and said ribs and recess portions formed in the other of said clamping piece portion and said ribs so as to be opposed to said convex portions are loosely fitted with each other so that said reel presser spring is clamped and fixed.

Also, it is preferable that said reel presser spring has a T-shaped tip end portion, and that the tip end portion is inserted and fitted in an under-cut portion provided in the inner surface of said upper half so that said reel presser spring is clamped and fixed.

Also, it is preferable that said reel presser spring has a cantilever support portion, that a tip end of the cantilever support portion is inserted and clamped between a pair of ribs implanted on the inner surface of said upper half, and that an anchor portion formed at the tip end of said cantilever support portion is engaged with a convex portion provided on an inner side surface of either one of said ribs so that said reel presser spring is fixed.

Also, it is preferable that a mounting piece made of a synthetic resin is formed at one end or in a middle of said reel presser spring by outsert molding, and that the mounting piece is fitted in or welded to a mounting portion projecting from said upper half so that said reel presser spring is mounted on said upper half.

Also, it is preferable that a tip end portion of the reel presser spring is inserted into a fitting portion formed in the inner surface of said upper half, and that the tip end portion is clamped and fixed by an anchor member to be snap-fitted in the fitting portion.

Also, in the recording media cartridge such as the magnetic tape cassette according to the present invention, members, parts and the like other than the reel presser spring and the mounting portion for mounting the reel presser spring are not particularly limited, and ones generally used in this kind of the magnetic media cartridge may be used therefor. Also, if other members and parts are also formed so as to be readily disassembled, it is easy to disassemble the magnetic media cartridge. This is advantageous for recycling respective parts and members and recycling sorted materials. Also, in the following description, the reel presser spring is not limited to one made of metal and may be formed of another material. For example, it is possible to use one made of a resin material that is different from that of the case body and particularly the upper half.

Also, especially, in order to achieve the above second object, it is preferable that a presser spring anchor portion for receiving said reel presser spring is formed on the inner surface of said upper half and that said reel presser spring is anchored in the presser spring anchor portion.

Also, in this case, it is preferable that said reel presser spring has a U-shaped insertion anchor portion, that said reel presser spring anchor portion has an implanted portion implanted in said inner surface of said upper half and a projecting portion projecting from the implanted portion over said inner surface, and that said insertion anchor portion of said reel presser spring is inserted into and anchored in a space defined between said inner surface of said upper half and said projecting portion.

Also, it is preferable that said reel presser spring has an anchoring bent portion located at one end portion, an arm portion preceded by the bent portion, a support portion which is curvedly preceded by the arm portion and comes in contact with said inner surface of said upper half and an elastic tongue portion which is curvedly preceded by the support portion and is used for urging said reel, and that said reel presser spring anchor portion has an implanted portion implanted in said inner surface of said upper half and a projecting portion projecting from the implanted portion over said inner surface with an anchor projection at which the bent portion of said reel presser spring is anchored being formed on its inner surface.

Also, it is preferable that said reel presser spring has an anchoring bent portion located at one end portion, an arm portion preceded by the bent portion, a support portion which is curvedly preceded by the arm portion, comes in contact with the inner surface of said upper half and is provided with an engagement hole portion, and an elastic tongue potion which is curvedly preceded by the support portion and is used for urging said reel, that said reel presser spring anchor portion has a projection implanted on said inner surface of said upper half and fitted in said engagement hole portion of said support portion of said reel presser spring, and that an anchor claw for anchoring said bent portion of said reel presser spring is provided at a tip end of an anchor member implanted on the inner surface of said lower half.

Further, in the recording media cartridge according to the present invention, the material forming the reel presser spring anchor portion or the forming method therefor may be selected as desired. Also, it is possible to assemble the cartridge as a separately formed component.

More specifically, the above-described reel presser spring anchor portion may be formed in accordance with various methods such as a method of integrally forming with the upper half by using a slide core, a method of welding the separately formed member to the inner surface of the upper half, and further a method of inserting the separately formed member into the anchor portion provided in the inner surface of the upper half.

Also, in order to achieve the above main object and the second object, according to a second aspect of the present invention, there is provided a recording media cartridge comprising a case body provided with an upper half and a lower half coupled with each other in a face-to-face relationship, and a reel which is rotatably received in this case body and around which a recording medium is wound, wherein a reel presser spring for urging said reel toward said lower half is formed integrally with a member constituting a transparent window provided in said upper half.

Here, the material forming the transparent window and the material forming the reel presser spring may be the same or different from each other. In the case where the components are made of different materials, so-called coinjection molding is performed.

Incidentally, it is preferable to mold the member forming the transparent window formed integrally with the reel presser spring by means of molds using the slide core.

Also, in order to achieve the above main object and the second object, according to a third aspect of the present invention, there is provided a recording media cartridge comprising a case body provided with an upper half and a lower half coupled with each other in a face-to-face relationship and a reel which is rotatably received in this case body and around which a recording medium is wound, wherein a reel presser spring for urging said reel toward said lower half is inserted through an insertion portion provided in said upper half and connecting a front surface side of the upper half to a rear surface side thereof.

Here, the insertion portion provided in the upper half may be provided in the member forming the transparent window provided in the upper half. Incidentally, in this case, it is preferable to use a pair of slits into which a single spring formed by integrating conventional two reel presser springs (separate members) is inserted.

Therefore, it is preferable that said reel presser spring has on both sides a pair of elastic portions for urging reels, respectively, a pair of bent portions located inside the elastic portions and bent at an obtuse angle, respectively and a flat portion inside the bent portions, that said insertion portion is a pair of slits provided in a member constituting a transparent window of said upper half, and that said pair of elastic portions on both sides of said reel presser spring are inserted into said case body through said pair of slits of said transparent window from the front surface side of said upper half, respectively, to thereby anchor said pair of bent portions in the pair of slits.

Also, it is preferable that said reel presser spring has an anchor hole provided in said flat portion, that the member constituting said transparent window of said upper half has a projection provided between the pair of slits of said transparent window, and that said projection of said transparent window is passed through said anchor hole of said reel presser spring to anchor said reel presser spring in said transparent window of said upper half.

Also, it is preferable that the member constituting said transparent window of said upper half has a recess portion provided between the pair of slits of said transparent window, and that said flat portion of said reel presser spring is embedded in the recess portion.

Also, said insertion portion may be provided in a portion other than said transparent window. In this case, it is preferable to provide a pair of insertion portions independent of each other which receive a pair of reel presser springs conventionally used as separate members as they are.

Therefore, it is preferable that said reel presser spring has a support end, an elastic portion slanted with respect to the support end, and a bent joint portion bent at two positions for coupling said support end and said elastic portion with each other, that said insertion portion has a recess portion provided on an outer surface side of a portion other than a transparent window of said upper half for embedding and engaging with said support end of said reel presser spring and a through-hole which communicates with the recess portion and through which said support end can be inserted into an inner surface side from said recess portion on the outer surface side of said upper half, and that said support end of said reel presser spring is inserted into said case body through said through-hole of said insertion portion from the front surface side of said upper half to thereby anchor said support end in said recess portion.

Also, it is preferable that said reel presser spring has an anchor hole provided at said support end, that said insertion portion has a projection provided in said recess portion, and that said projection of said recess portion is passed through said anchor hole of said reel presser spring to thereby anchor said reel presser spring in said insertion portion of said upper half.

Also, especially, in order to achieve the above third object, according to a third aspect of the present invention, it is preferable that said reel presser spring is a reel presser spring in which an insertion portion having at least two bent portions is formed and is inserted into said insertion portion provided in said upper half.

Here, the reel presser spring insertion portion provided in said upper half is preferably formed by a common molding technique which does not use the slide core.

Also, it is preferable that at least two bent portions formed in said reel presser spring each have a sufficient dimension to exhibit a predetermined spring elasticity in a state in which the spring is inserted into said reel presser spring insertion portion.

Also, in order to achieve the above main object and the fourth object, according to a fourth aspect of the present invention, there is provided a recording media cartridge comprising a case body provided with an upper half and a lower half coupled with each other in a face-to-face relationship and a reel which is rotatably received within this case body and around which a recording medium is wound, wherein a reel presser spring for urging said reel toward said lower half is mounted outside said case body and has at one end an anchor end anchored on an outer surface of the upper half or the lower half and at the other end a reel urging end which passes through a through-hole provided in said upper half, comes in contact with a top portion of said reel and urges the reel toward the lower half.

In this case, it is preferable that said anchor end is anchored in an anchor portion provided in said upper half or an anchor portion provided in said lower half.

Also, it is preferable that said through-hole is provided on a side wall or an upper plate of said upper half.

In this aspect, the reel presser spring may be provided in any position on the outside of the case body if the reel urging end can urge the reel such as the tape reel received in the case body toward the lower half in the selected position without hindering the function of the other members and parts of the recording media cartridge such as the magnetic tape cassette. The mounting place and the number of the springs to be mounted may be suitably determined in accordance with the positions, the number, the shape and the like of the tape reels to be received in the case body.

Also, in order to achieve the main object and the fifth object, according to a fifth aspect of the present invention, there is provided a recording media cartridge comprising a case body provided with an upper half and a lower half coupled with each other in a face-to-face relationship, a reel which is rotatably received within this case body and around which a recording medium is wound, a receiving portion provided between said upper half and said lower half, a reel lock member inserted slidably into said receiving portion for preventing said reel from rotating, and an easy-to-destroy thin groove portions formed on an outer wall of said receiving portion at least in said lower half.

In this case, it is preferable that a portion constituting said thin groove portions includes at least a bottom surface of said receiving portion of said reel lock member in said lower half, and it is more preferable that a portion constituting said thin groove portions includes a bottom surface and a side surface (rear side) of said receiving portion of said reel lock member.

Incidentally, the recording media cartridges according to the respective aspects of the present invention is applied to a magnetic tape cassette having a magnetic tape (magnetic recording tape) and a case body for receiving this magnetic tape rotatably. The magnetic tape cassette to which the recording media cartridge is applied may be a one-reel type in which a magnetic tape that may be drawn from the case body or received in a predetermined position to be travelable is wound around a single tape reel or a two-reel type in which the magnetic tape is wound around a pair of tape reels.

Also, in the recording media cartridges in the respective aspects of the present invention, the case body or the body case refers to a component essentially composed of upper and lower halves and including a tape reel around which a magnetic tape is wound, members to be mounted on the upper half or the lower half to retain or receive part of the magnetic tape drawn out of the tape reel and other members to be mounted on the upper half or lower half.

For example, the other members in the two-reel type magnetic tape cassette to be described later include those composed of a plurality of members including a front cover to be mounted on the upper half (outer lid, upper lid, inner lid) and the like and formed by combining the upper and lower halves. Incidentally, in the recording media cartridges in the respective aspects of the present invention, the reel received within the case body is urged toward the lower half by means of the reel presser spring mounted outside the case body.

DETAILED DESCRIPTION OF THE INVENTION

A recording media cartridge according to the present invention will now be described in detail on the basis of preferred embodiment modes shown in the accompanying drawings.

First of all, a first aspect of the present invention will now be described with reference to FIGS. 1 to 15.

In the following description, an example in which the present invention is applied to a two-reel type magnetic tape cartridge, i.e., a so-called magnetic tape cassette is exemplified as a typical example.

Figure 33:
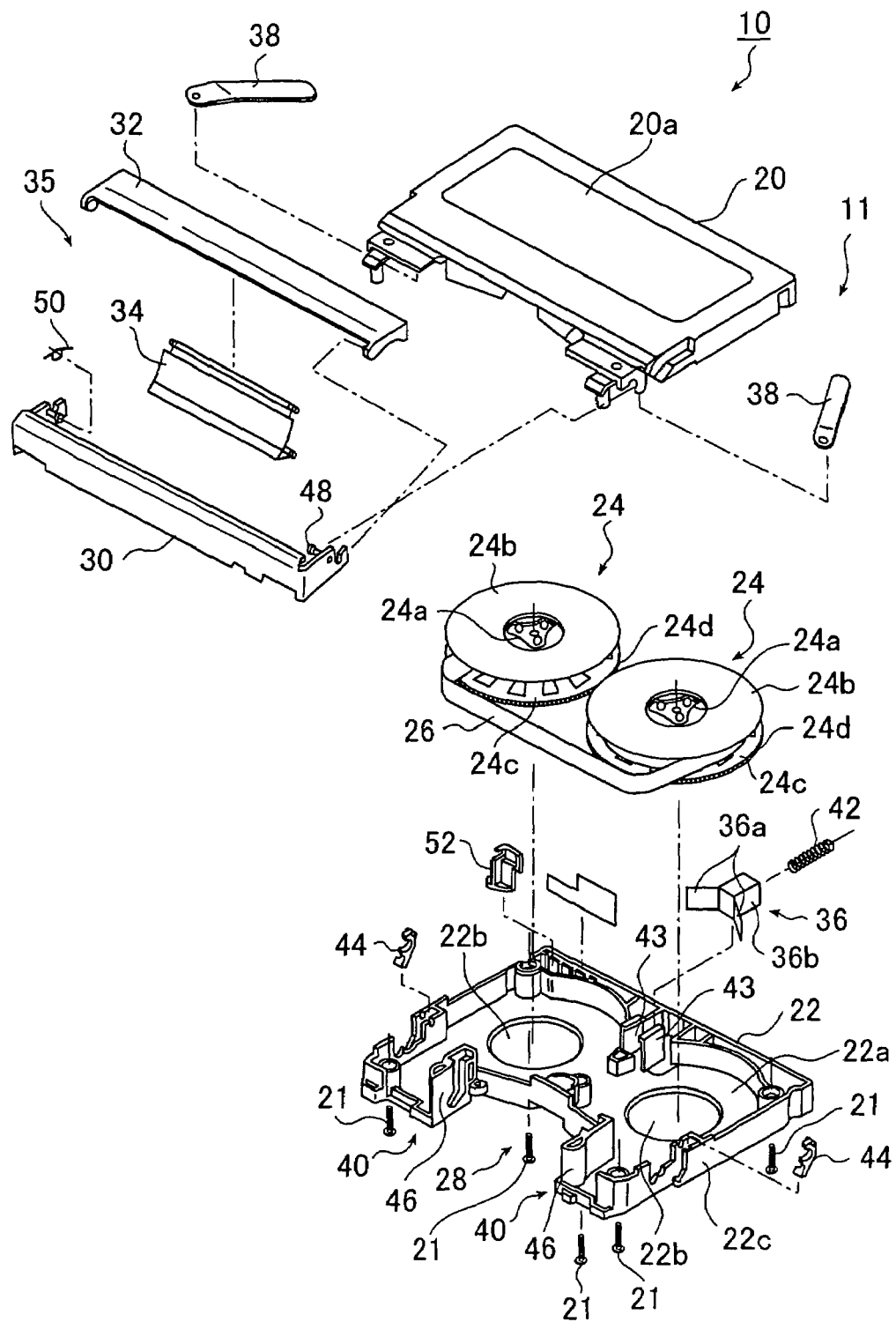
FIG. 33 is an exploded perspective view showing primary constituent members of a conventional magnetic tape cassette.

Incidentally, in a first embodiment mode of the first aspect of the present invention shown in FIGS. 1 to 9, other members, components and the like other than a mounting portion of an upper half on which a reel presser spring is mounted and the reel presser spring are not particularly limited and may be the like members in the conventional magnetic tape cassette shown in FIG. 33 described above or may be different ones. In the following description, only the reel presser spring of the magnetic tape cassette and the mounting portion of the upper half on which the reel presser spring is mounted will be described.

Figure 1:
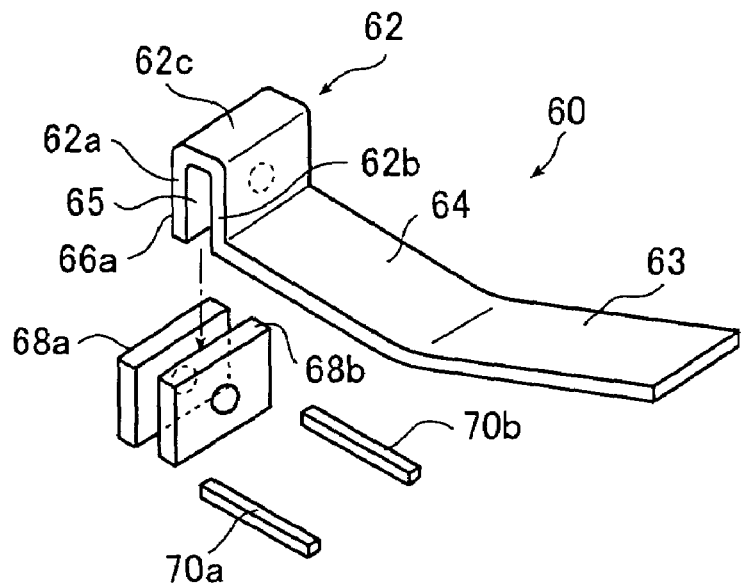
FIG. 1 is a perspective view illustrating a reel presser spring and a mounting portion of an upper half of a magnetic tape cassette in accordance with one embodiment of a first embodiment mode of a first aspect of the present invention.

FIG. 1 shows one embodiment of the first embodiment mode of this aspect and is an exploded perspective view of a reel presser spring which is to be mounted on an inner surface of an upper half shown in an overturn manner, and its mounting portion in a magnetic tape cassette according to this embodiment.

Figure 2A:
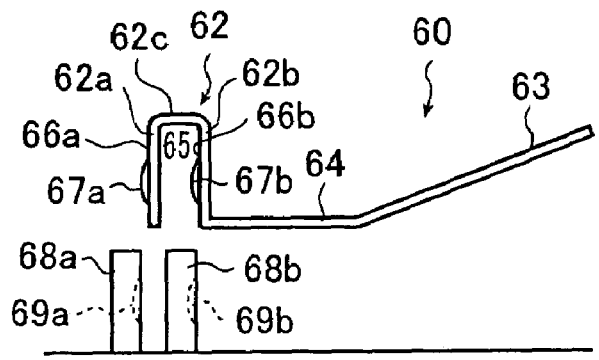
FIG. 2A is a schematic cross-sectional view illustrating a structural example of the reel presser spring and the mounting portion of the upper half shown in FIG. 1.

As shown in the drawing, the planar reel presser spring (reel urging leaf spring) 60 for urging the reel toward a lower half is a modification of the conventional reel presser spring 38 shown in FIG. 33 and has at one end a cantilever support portion 62 formed in a reverse-C-shape (U-shape) in cross-section and at the other end an elastic tongue portion 63 for urging a tape reel (not shown) to be received inside of the upper half toward the lower half (in the upward direction in the drawings). The cantilever support portion 62 and the elastic tongue portion 63 are connected to each other through a joint arm portion 64. The elastic tongue portion 63 is bent toward the lower half (in the upward direction in the drawings). The cantilever support portion 62 is composed of an outer clamping piece portion 62a and an inner clamping piece portion 62b facing through a groove 65 and a joint portion 62c for connecting the outer clamping member 62a and the inner clamping member 62b with each other. As shown in FIG. 2A, convex portions 67a and 67b are provided on an outer side surface 66a of the outer clamping member 62a and an inner side surface 66b of the inner clamping member 62b, respectively.

On the other hand, a pair of planar clamping fixing ribs 68a and 68b are implanted to face each other in a position where the reel presser spring 60 is mounted to form the mounting portion on the inner surface (not shown) of the upper half on which the reel presser spring 60 is to be mounted. A recess portion 69a with which the convex portion 67a is loosely fitted is formed corresponding to the convex portion 67a provided on the outer side surface 66a of the outer clamping member 62a of the cantilever support portion 62 on the inner side surface of this clamping fixing rib 68a as shown in FIG. 2A. On the other hand, a recess portion 69b with which the convex portion 67b is loosely fitted is formed corresponding to the convex portion 67b provided on the inner side surface 66b of the inner clamping member 62b of the cantilever support portion 62 on the outer side surface of the clamping fixing rib 68b. Also, the clamping fixing rib 68a and the clamping fixing rib 68b are provided at such an interval that the outer clamping member 62a of the above-described cantilever support portion 62 is inserted. Furthermore, the clamping fixing rib 68b is fitted into the groove 65 between the outer clamping member 62a and the inner clamping member 62b of the above-described cantilever support portion 62.

Also, regulating ribs 70a, 70b arranged at an interval corresponding to a width of the joint arm portion 64 of the reel presser spring 60 are formed on the inner surface of the upper half. When the reel presser spring is to be mounted on the upper half of the magnetic tape cassette, the joint arm portion 64 of the reel presser spring 60 is positioned between the regulating ribs 70a, 70b to thereby regulate the movement of the reel presser spring 60 in a direction along the inner surface of the upper half.

Figure 2B:
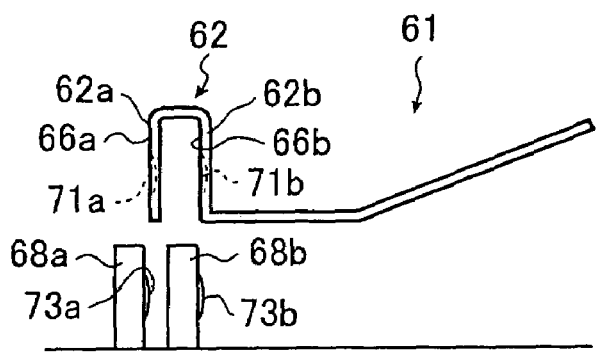
FIG. 2B is a schematic cross-sectional view showing another structural example.

Incidentally, like a reel presser spring 61 as shown in FIG. 2B, recess portions 71a and 71b may be provided on the outer side surface 66a of the outer clamping member 62a and the inner side surface 66b of the inner clamping member 62b of the cantilever support portion 62 formed into a U-shape in cross-section, respectively, a convex portion 73a which is loosely fitted with the recess portion 71a may be formed corresponding to the recess portion 71a provided on the outer side surface 66a of the inner clamping member 62a of the cantilever support portion 62 on the inner side surface of the clamping fixing rib 68a implanted in the upper half inner surface, and furthermore, a convex portion 73b which is loosely fitted with the recess portion 71b may be formed corresponding to the recess portion 71b provided in the inner side surface 66b of the inner clamping member 62b of the cantilever support portion 62 on the outer side surface of the clamping fixing rib 68b.

In the magnetic tape cassette having the reel presser spring and its mounting portion of the structure shown in FIG. 1 and FIGS. 2A and 2B, the outer clamping member of the cantilever support portion is inserted between the pair of clamping fixing ribs provided on the inner surface of the upper half, and the convex portions formed in the outer clamping member and the inner clamping member or in the outer side surface and the inner side surface of the pair of clamping fixing ribs are loosely fitted with the recess portions for fixing. In this case, the joint arm portion of the reel presser spring is positioned between the pair of regulating ribs to thereby regulate the movement of the reel presser spring in the direction along the inner surface of the upper half.

Thus, the reel presser spring mounted on the upper half may perform sufficiently the function that is required for the reel presser spring and at the same time the reel presser spring may readily be removed away from the upper half when disassembling the magnetic tape cassette. For this reason, this magnetic tape cassette has a superior assembling property for assembling, and at the same time, when the magnetic tape cassette is to be disassembled in order to sort every material upon wasting or to recycle each part or member by disassembling the rejected product from the manufacturing process, the cassette may readily be disassembled and hence is advantageous.

Figure 3A:
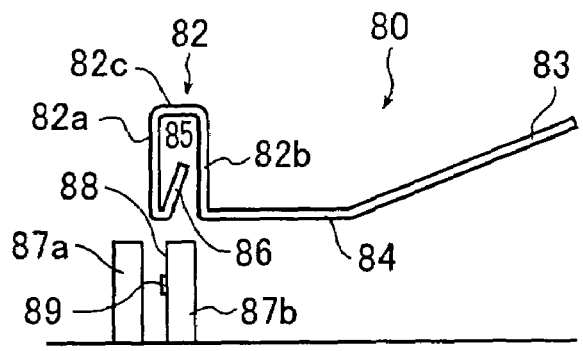
FIG. 3A is a schematic cross-sectional view showing a reel presser spring and a mounting portion of an upper half of a magnetic tape cassette according to another embodiment of the present invention and FIG. 3B is a view showing a modification example thereof.
Figure 3B:
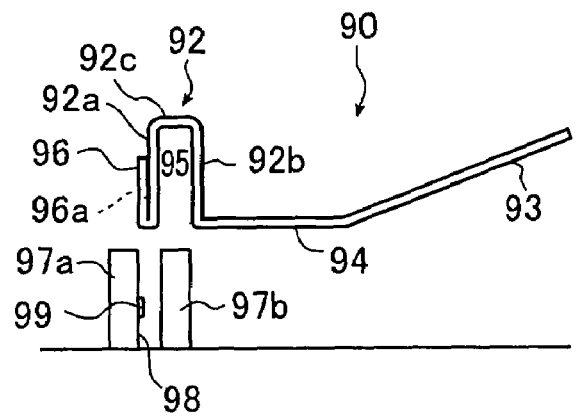

Also, the reel presser spring according to another embodiment shown in FIGS. 3A and 3B has a cantilever support portion at one end, a tip end of the cantilever support portion is inserted and clamped between a pair of ribs implanted in the inner surface of the upper half, and an anchor portion formed at the tip end of the cantilever support portion is engaged with a convex portion formed in the inner side surface of either one of the ribs.

A reel presser spring 80 shown in FIG. 3A has at one end a cantilever support portion 82 and at the other end an elastic tongue portion 83 for urging a tape reel (not shown) received inside of the upper half toward the lower half (in the upward direction in the drawings).

The cantilever support portion 82 and the elastic tongue portion 83 are connected with each other through a joint arm portion 84. The elastic tongue portion 83 is bent toward the lower half (in the upward direction in the drawings). The cantilever support portion 82 has an outer clamping piece portion 82a and an inner clamping piece portion 82b facing each other through a groove 85 and a joint portion 82c connecting the outer clamping member 82a and the inner clamping member 82b. The outer clamping piece portion 82a has an elastic anchor portion 86 bent toward the groove 85.

On the other hand, a pair of planar clamping fixing ribs 87a and 87b are implanted facing each other in a position where the reel presser spring 80 is to be mounted to form the mounting portion in the inner surface (not shown) of the upper half on which the reel presser spring 80 is to be mounted. A convex portion 89 for anchoring the elastic anchor portion 86 of the outer clamping member 82a of the above-described cantilever support portion 82 is formed on an inner side surface 88 of the clamping fixing rib 87b. Also, the clamping fixing rib 87a and the clamping fixing rib 87b are arranged at such an interval that the outer clamping member 82a of the above-described cantilever support portion 82 is inserted therebetween. Furthermore, the clamping fixing rib 87b is fitted into the groove 85 between the outer clamping member 82a and the inner clamping member 82b of the above-described cantilever support portion 82.

Also, a reel presser spring 90 shown in FIG. 3B has at one end a cantilever support portion 92 and at the other end an elastic tongue portion 93 for urging a tape reel (not shown) to be received inside of the upper half toward the lower half (in the upward direction in the drawings).

The cantilever support portion 92 and the elastic tongue portion 93 are connected with each other through a joint arm portion 94. The elastic tongue portion 93 is bent toward the lower half (in the upward direction in the drawings). The cantilever support portion 92 has an outer clamping piece portion 92a and an inner clamping piece portion 92b facing each other through a groove 95 and a joint portion 92c connecting the outer clamping member 92a and the inner clamping member 92b with each other. The outer clamping piece portion 92a is bent toward the outside and has an elastic anchor portion 95 overlapping with the outer surface of the outer clamping piece portion 92a. A recess portion 96a is formed in the elastic anchor portion 96.

On the other hand, a pair of planar clamping fixing ribs 97a and 97b are implanted facing each other at a position where the reel presser spring 90 is to be mounted to form the mounting portion in the inner surface (not shown) of the upper half where the reel presser spring 90 is to be mounted. A convex portion 99 that is to engage with the recess portion 96a of the elastic anchor portion 96 of the outer clamping member 92a of the above-described cantilever support portion 92 is formed in the inner surface 98 of this clamping fixing rib 97a. Also, the clamping fixing rib 97a and the clamping fixing rib 97b are arranged at such an interval that the outer clamping member 92a of the above-described cantilever support portion 92 is inserted therebetween. Furthermore, the clamping fixing rib 97b is fitted into the groove 95 between the outer clamping member 92a and the inner clamping member 92b of the above-described cantilever support portion 92.

Also, in the magnetic tape cassette having the structure shown in FIGS. 3A and 3B, in the same manner as in the magnetic tape cassette shown in FIG. 1 described above, a pair of regulating ribs arranged at the interval corresponding to the width of the joint arm portion 84 or 94 of the reel presser spring 80 or 90 may be arranged on the inner surface of the upper half. When the reel presser spring is to be mounted on the upper half of the magnetic tape cassette, the joint arm portion 84 or 94 of the reel presser spring 80 or 90 is positioned between the pair of regulating ribs to enable regulation of the movement of the reel presser spring 80 or 90 in the direction along the inner surface of the upper half.

In the magnetic tape cassette having the reel presser spring and the mounting portion having the structure shown in FIG. 3A or FIG. 3B, the outer clamping member of the cantilever support portion is inserted between the pair of clamping fixing ribs provided on the inner surface of the upper half, the elastic anchor portion of the outer clamping member is engaged with the convex portion on the outer surface or the inner surface of the clamping fixing rib and furthermore, in the reel presser spring shown in FIG. 3B, the convex portion of the clamping fixing rib is engaged with the recess portion provided in the elastic anchor portion to thereby fix the reel presser spring. In this case, the joint arm portion of the reel presser spring is positioned between the pair of regulating ribs to regulate the movement of the reel presser spring in the direction along the inner surface of the upper half.

Thus, the reel presser spring mounted on the upper half may perform sufficiently the function that is required for the reel presser spring and at the same time the reel presser spring may readily be removed away from the upper half by releasing the engagement between the elastic anchor portion of the cantilever support portion and the inner side surface of the clamping fixing rib when disassembling the magnetic tape cassette. For this reason, this magnetic tape cassette has a superior assembling property for assembling, and at the same time, when the magnetic tape cassette is to be disassembled in order to sort every material upon wasting or to recycle each part or member by disassembling the rejected product from the manufacturing process, the cassette may readily be disassembled and hence is advantageous.

Subsequently, a reel presser spring 100 according to another embodiment shown in FIG. 4 has at one end a cantilever support portion 103 having a tip end portion 102 formed into a T-shape and at the other end an elastic tongue portion 104 for urging a tape reel (not shown) received inside of the upper half toward the lower half (in the upward direction in the drawing). The cantilever support portion 103 and the elastic tongue portion 104 are connected with each other through a joint arm portion 105. The elastic tongue portion 105 is bent toward the lower half (in the upward direction in the drawing).

On the other hand, an under-cut portion 107 composed of a pair of L-shaped clamping fixing members 106a and 106b implanted so as to engage with both ends of the T-shaped tip end portion 102 of the above-described cantilever support portion 103 having passed therethrough are provided as the mounting portion in the inner surface (not shown) of the upper half on which the reel presser spring 100 is to be mounted.

Figure 4:
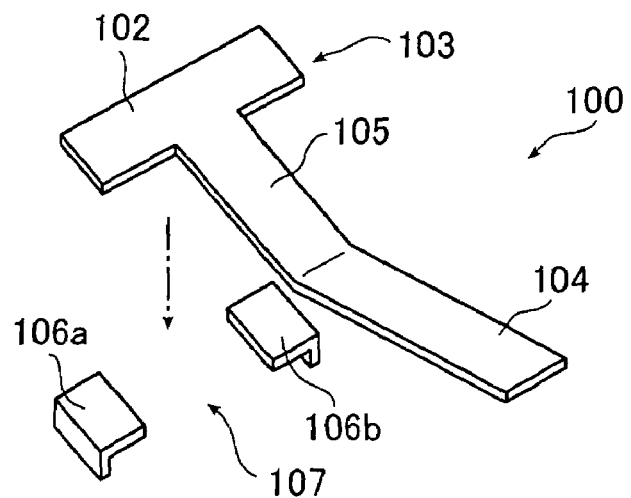
FIG. 4 is a perspective view illustrating a reel presser spring and a mounting portion of an upper half according to another embodiment of the present invention.

In the magnetic tape cassette having the under-cut portion and the reel presser spring having the structure shown in this FIG. 4, the tip end portion 103 of the cantilever support portion 102 is caused to pass through the under-cut portion 107 and both ends of the tip end portion 103 are clamped by the L-shaped clamping fixing members 106a and 106b to thereby fix the reel presser spring.

Thus, the reel presser spring mounted on the upper half may sufficiently perform the function that is required for the reel presser spring and at the same time the reel presser spring may readily be detached from the upper half by drawing the tip end portion of the cantilever support portion of the reel presser spring from the under-cut portion when disassembling the magnetic tape cassette. For this reason, this magnetic tape cassette has a superior assembling property for assembling, and at the same time, when the magnetic tape cassette is to be disassembled in order to sort every material upon wasting or to recycle each part or member by disassembling the rejected product from the manufacturing process, the cassette may readily be disassembled and hence is advantageous.

Figure 5:
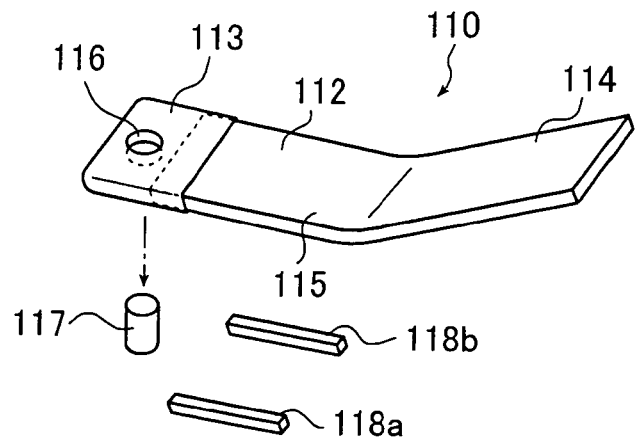
FIG. 5 is a perspective view illustrating a reel presser spring and a mounting portion of an upper half according to another embodiment of the present invention.
Figure 6:
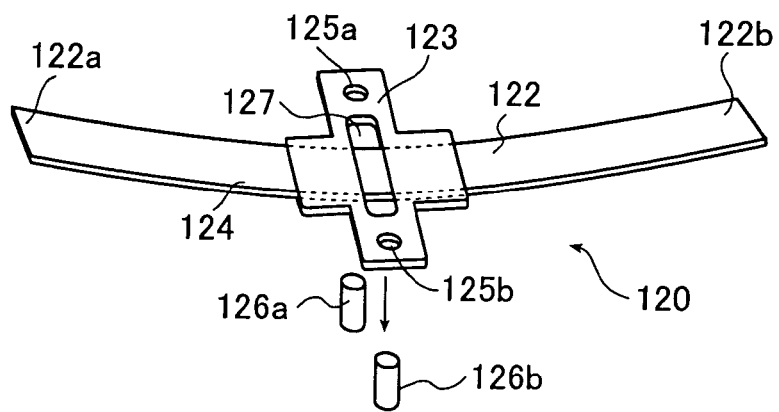
FIG. 6 is a perspective view illustrating a reel presser spring and a mounting portion of an upper half according to another embodiment of the present invention.

Furthermore, in a magnetic tape cassette having the mounting portion and the reel presser spring according to other embodiments shown in FIGS. 5 and 6, a mounting piece made of a synthetic resin is formed at one end or in the middle of the reel presser spring by outsert molding and the mounting piece is fitted in or welded by ultrasonic welding to the mounting portion projecting from the upper half so that the reel presser spring is mounted on the upper half.

In a reel presser spring 110 shown in FIG. 5, a mounting piece 113 made of synthetic resin is formed by outsert molding on a cantilever support portion at one end of a reel presser spring body 112. The spring has at the other end an elastic tongue portion 114 for urging a tape reel (not shown) to be received inside of the upper half toward the lower half (in the upward direction in the drawing). The elastic tongue portion 114 and the cantilever support portion where the mounting piece 113 is formed are coupled with each other through a joint arm portion 115. The elastic tongue portion 114 is bent toward the lower half (in the upward direction in the drawing). Also, a mounting hole 116 is formed in the mounting piece 113.

On the other hand, a fixing rib 117 to be inserted into the mounting hole 116 of the mounting piece 113 is implanted in the inner surface (not shown) of the upper half on which the reel presser spring 110 is to be mounted to form the mounting portion.

A pair of regulating ribs 118a and 118b arranged at an interval corresponding to a width of the joint arm portion 115 of the reel presser spring 110 are arranged on the inner surface of the upper half. When the reel presser spring is to be mounted on the upper half of the magnetic tape cassette, the joint arm portion 115 of the reel presser spring 110 is positioned between the pair of regulating ribs 118a, 118b to thereby regulate the movement of the reel presser spring 110 in a direction along the inner surface of the upper half.

In the magnetic tape cassette having the mounting portion and the reel presser spring having the structure shown in FIG. 5, the fixing rib 117 of the upper half is fitted into the mounting hole 116 of the mounting piece 113 and the joint arm portion 115 is fitted between the regulating ribs 118a and 118b to thereby fix the reel presser spring and regulate the movement in the direction along the inner surface of the upper half. In this case, the fixing rib 117 fitted into the mounting hole 116 may be welded.

Also, in a reel presser spring 120 shown in FIG. 6, a mounting piece 123 made of synthetic resin is formed in the middle of a reel presser spring body 122 by outsert molding. The spring has at both ends elastic tongue portions 122a and 122b for urging a tape reel (not shown) to be received inside of the upper half toward the lower half (in the upward direction in the drawing). The elastic tongue portions 122a and 122b are coupled with each other through a joint arm portion 124. The elastic tongue portions 122a and 122b are bent toward the lower half (in the upward direction in the drawing). Also, mounting holes 125a and 125b are formed at both ends traversing the joint arm portion 124.

On the other hand, fixing ribs 126a and 126b passing through the mounting holes 125a and 125b are implanted corresponding to the mounting holes 125a and 125b in the inner surface (not shown) of the upper half, respectively, on which the reel presser spring 120 is mounted to thereby form the mounting portion.

In the magnetic tape cassette having the mounting portion and the reel presser spring having the structure shown in FIG. 6, the fixing ribs 126a and 126b on the inner surface of the upper half are fitted into the mounting holes 125a and 125b, respectively, to thereby fix the reel presser spring in place and to thereby regulate the movement in the direction along the inner surface of the upper half. In this case, the fixing ribs 126a and 126b fitted into the mounting holes 125a and 125b may be welded.

Figure 7:
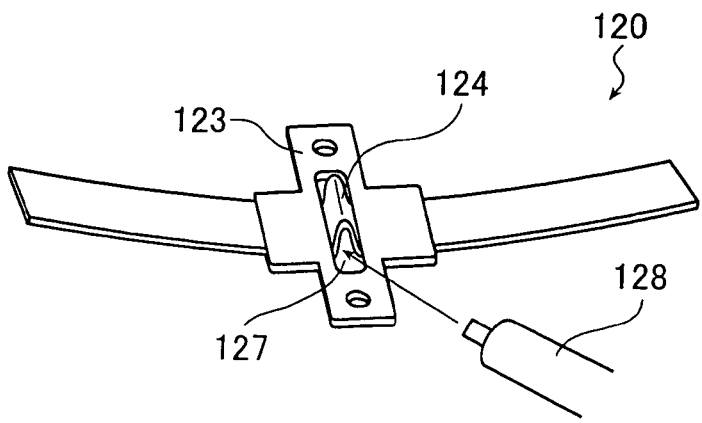
FIG. 7 is a perspective view illustrating the removal of the reel presser spring from the mounting portion according to another embodiment of the present invention.

Also, when the reel presser spring having the structure shown in FIG. 6 is to be disassembled, it is possible to readily separate the reel presser spring 122 away from the mounting piece 123 by inserting a tip end of a driver 128 or the like as shown in, for example, FIG. 7 and hooking and drawing the joint arm portion 124 of the reel presser spring body 122 to be exposed from an opening portion 127 provided in the central portion of the mounting piece 123 formed in the center by outsert molding.

Thus, as shown in FIGS. 5 and 6, the reel presser spring mounted on the upper half may sufficiently perform the function that is required for this reel presser spring, and the reel presser spring may readily be detached away from the upper half by drawing the fixing rib from the mounting hole when disassembling the magnetic tape cassette. For this reason, this magnetic tape cassette has a superior assembling property for assembling, and at the same time, when the magnetic tape cassette is to be disassembled in order to sort every material upon wasting or to recycle each part or member by disassembling the rejected product from the manufacturing process, the cassette may readily be disassembled and hence is advantageous.

Figure 8:
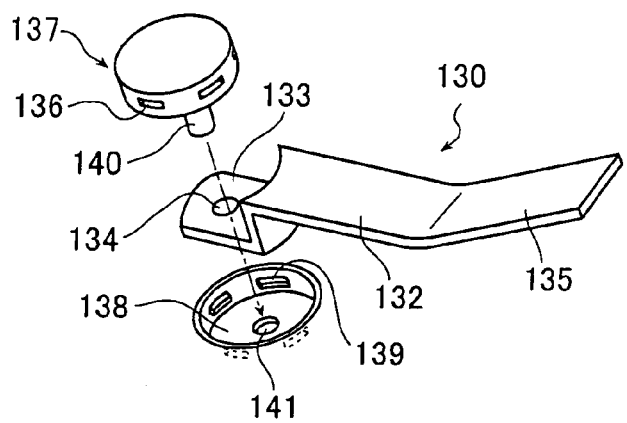
FIG. 8 is a perspective view illustrating a reel presser spring and a mounting portion of an upper half according to another embodiment of the present invention.

Also, furthermore, in a reel presser spring 130 of another embodiment shown in FIG. 8, a mounting hole 134 is formed at a bent end 133 of a reel presser spring body 132. The spring has at the other end an elastic tongue portion 135 for urging a tape reel (not shown) to be received inside of the upper half toward the lower half (in the upward direction in the drawing). The elastic tongue portion 135 is bent toward the lower half (in the upward direction in the drawing).

On the other hand, a fitting portion 138 into which a clamping member 137 having screw-fit grooves 136 on its outer circumferential surface is helically snap-fitted is formed in the inner surface of the upper half on which the reel presser spring 130 is mounted. Screw grooves 139 threadly engaged with the screw-fit grooves 136 of the clamping member 137 are formed in the inner circumferential surface of the fitting portion 138. A fitting hole 141 corresponding to the mounting hole 134 into which a mounting shaft core 140 of the clamping member 137 is inserted is formed in the bottom portion of the fitting portion 138.

Figure 9:
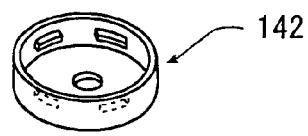
FIG. 9 is a view illustrating a mounting portion of a magnetic tape cassette in accordance with another embodiment of the present invention.

Also, as shown in FIG. 9, a fitting member 142 having the same structure as the fitting portion 138 shown in FIG. 8 is formed as a separate member. This may form the fitting portion welded in a predetermined position on the inner surface of the upper half.

In the magnetic tape cassette having the fitting portion and the reel presser spring having the structure shown in FIG. 8 or the fitting portion formed by welding the fitting member shown in FIG. 9 to the upper half, the bent end 133 of the reel presser spring 130 is fitted into the fitting portion 138 provided in the inner surface of the upper half, the mounting shaft core 140 of the clamping member 137 is caused to pass through the mounting hole 134 to be inserted into the fitting hole 141, the screw-fit grooves 136 of the clamping member 137 are threadly engaged with the screw grooves 139 of the fitting portion 138, and the reel presser spring may be fixed to the fitting portion 138.

A second embodiment mode of the first aspect of the present invention will now be described with reference to FIGS. 10 to 15.

Figure 10:
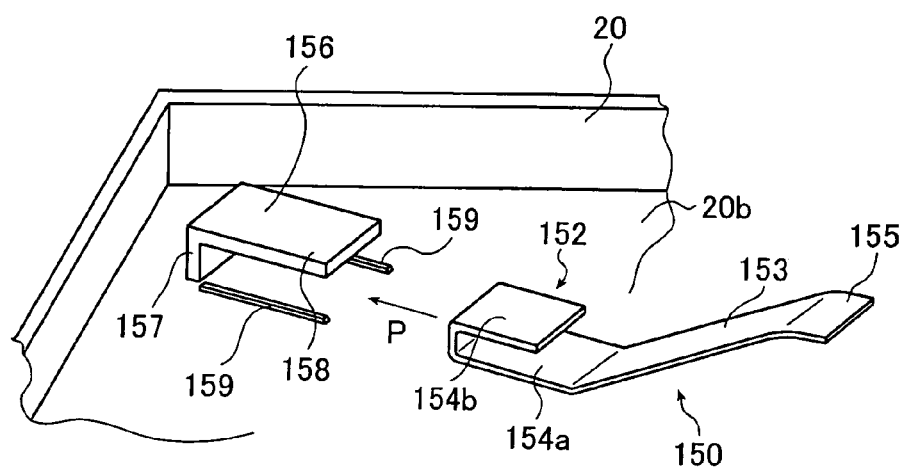
FIG. 10 is a partially enlarged perspective view of an inner surface of an upper half of a magnetic tape cassette in accordance with one embodiment of a second embodiment mode of the first aspect of the present invention.

FIG. 10 is a partially enlarged perspective view of the inner surface with the upper half of the magnetic tape cassette in accordance with one embodiment of this embodiment mode shown in a turnover manner. Incidentally, the main points will be described only while omitting the overall structure of the magnetic tape cassette described above.

In FIG. 10, symbol 20b denotes the inner surface of the bottom surface of the upper half 20. A reel presser spring insertion portion 156 is formed at two points each close to a corner of the upper half 20 (only one point is shown in the drawing) for inserting and anchoring a planer reel presser spring 150 formed at one end portion with a U-shaped insertion anchor portion 152. The reel presser spring 150 is obtained by modifying the conventional reel presser spring 38 shown in FIG. 33 as in the reel presser spring 60 shown in FIG. 1. The U-shaped cantilever support portion 62 of the reel presser spring 60 shown in FIG. 1 is formed at right angles with the joint arm portion 64 which is followed by the elastic tongue portion 63, whereas the U-shaped insertion anchor portion 152 is formed so that a support piece portion 154a on the side supported by the bottom surface 20b of the upper half does not form a right angle with the following elastic tongue portion 153. Incidentally, as shown in FIG. 10, a bent portion 155 may be provided at a tip end of the elastic tongue portion 153 of the reel presser spring 150, and a contact area of the bent portion 155 with the reel 24 may be increased to thereby urge the reel without fail toward the lower half.

The reel presser spring insertion portion 156 formed on the bottom surface 20b of the upper half 20 has an implanted portion 157 implanted in the bottom surface 20b and an overhanging portion 158 overhanging over the bottom surface 20b from the implanted portion 157, and the insertion anchor portion 152 of the reel presser spring 150 is inserted and fitted into the space formed between the bottom surface 20b and the overhanging portion 158 to be anchored. At this time, it is preferable that an open piece portion 154b facing the support piece portion 154a of the insertion anchor portion 152 of the reel presser spring 150 is brought into elastic contact with the overhanging portion 158 of the reel presser spring insertion portion 156 and that the reel presser spring 150 is fixed to the reel presser spring insertion portion 156.

Incidentally, the reel presser spring insertion portion 156 may be formed by resin molding. Alternatively, a method in which a separately formed member is welded may be used.

Also, in the case where the reel presser spring insertion portion 156 is formed by resin molding, it is also preferable to provide guides (convex portions) 159, 159 on both sides of the reel presser spring insertion portion 156 on the inner surface 20b of the upper half 20 for determining the positions in the right and left directions upon insertion of the reel presser spring 150.

According to this embodiment, the reel presser spring 150 is inserted into the reel presser spring insertion portion 156 of the upper half 20 as indicated by an arrow P so that the reel presser spring 150 may readily be mounted. Also, it is possible to assemble or disassemble the reel presser spring with an efficiency as high as or higher than that in the case of fixing the reel presser spring to the upper half by welding such as ultrasonic welding or thermal welding, caulking, adhesion or the like and this change of the fixing method does not adversely affect the basic performance of the magnetic tape cassette.

That is, in the mounting structure of the reel presser spring according to this embodiment, since the number of the parts to be used is decreased in the process of assembling this, the number of steps for assembling is decreased and in addition, not only is it possible to administrate the parts and to reduce the cost but also it is possible to obtain a large economical advantage to considerably simplify the work upon disassembling this.

Figure 11:
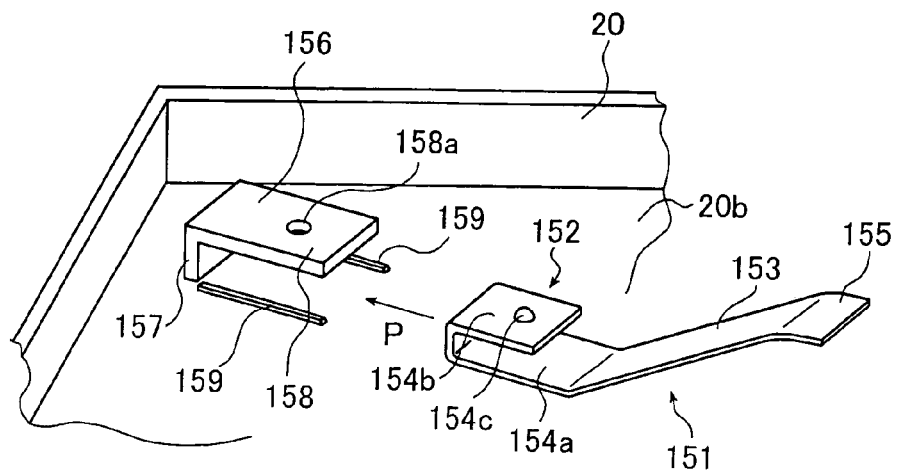
FIG. 11 is a partially enlarged perspective view of an inner surface of an upper half of a magnetic tape cassette according to another embodiment of the present invention.

Subsequently, another embodiment of this embodiment mode is shown in FIG. 11. In the embodiment shown in FIG. 11, as in the embodiment shown in FIG. 10, a convex portion 154c is formed on an open piece portion 154b of a U-shaped insertion anchor portion 152 at an end portion in a reel presser spring 151, and a reel presser spring insertion portion 156 having an anchor hole 158a provided at a position corresponding to the above-described convex portion 154c is formed on the bottom inner surface 20b of the upper half 20.

Also, according to this embodiment mode, the reel presser spring 151 is inserted into the reel presser spring insertion portion 156 of the upper half 20, which facilitates the mounting of the reel presser spring 151. Incidentally, in the reel presser spring anchoring structure according to this embodiment mode, the convex portion 154c of the reel presser spring 151 is anchored without fail by means of the anchor hole 158a of the reel presser spring insertion portion 156, which also provides the effect of enhancing the stability after the anchoring.

With respect to the above-described anchor hole 158a of the reel presser spring insertion portion 156 and the above-described convex portion 154c of the reel presser spring 151, it is possible to change this structure to a combination of a convex portion and a groove. According to this embodiment mode, it is possible to assemble or disassemble the reel presser spring with an efficiency as high as or higher than that in the case of fixing the reel presser spring to the upper half by thermal welding, caulking, adhesion or the like and this change of the fixing method does not adversely affect the basic performance of the magnetic tape cassette.

Figure 12A:
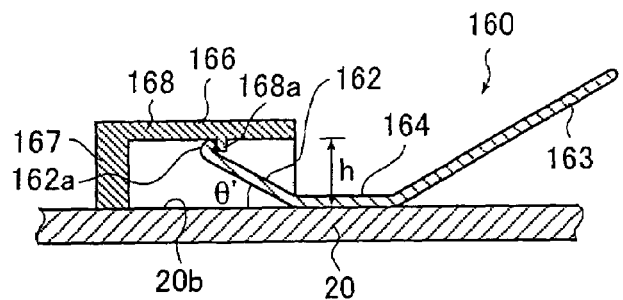
FIG. 12A is a partially cross-sectional view of the vicinity of a reel presser spring insertion portion on an inner surface of an upper half of a magnetic tape cassette according to another embodiment of the present invention and FIG. 12B is a side elevational view showing the reel presser spring before insertion.
Figure 12B:
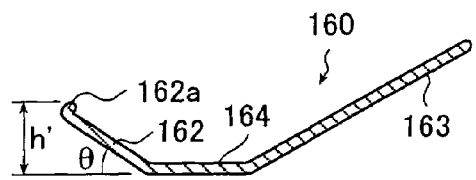

Next, FIGS. 12A and 12B show still another embodiment of this embodiment mode. FIG. 12A is a partially enlarged cross-sectional view of an inner surface of an upper half of a magnetic tape cassette according to this embodiment with the upper half being turned over. FIG. 12B is a side elevational view of a reel presser spring before insertion. Incidentally, also here, only the main points will be described.

Unlike the embodiments shown in FIGS. 10 and 11, a reel presser spring 160 shown in FIGS. 12A and 12B has a small anchoring bent portion 162a at one end, and a subsequent arm portion 162, which is curvedly followed by or extending to a support portion 164 which comes in contact with the bottom inner surface 20b of the upper half 20 and which is then curvedly followed by an elastic tongue portion 163 to take a substantially V-shape as a whole. Also, on the side of the upper half 20 corresponding to this, a reel presser spring insertion portion 166 including a projecting portion 168 with an inner surface on which an anchor projection 168a is formed for anchoring the bent portion 162a of the reel presser spring 160 and an implanted portion 167 for supporting the overhanging portion 168 is formed.

Incidentally, here, the bent portion 162a of the reel presser spring 160 has a free height h' (h<h') that is greater than a height h of the reel presser spring insertion portion 166 as shown in FIG. 12B before it is inserted into the reel presser spring insertion portion 166 with respect to the support portion 164. In other words, although the portion of the reel presser spring 160 to be inserted into the reel presser spring insertion portion 166 has an angle of θ (an angle defined between the support portion 164 and the arm portion 162) with respect to the horizontal portion, this is inserted into the reel presser spring insertion portion 166 so that the above-described angle θ is compressed to obtain an angle of 0' (refer to FIG. 12A, θ>θ').

In this embodiment, the anchoring force, within the reel presser spring insertion portion 166, of the reel presser spring 160 inserted into the reel presser spring insertion portion 166 is generated mainly by the reactive force against the above-described compression, the frictional force between the lower surface of the reel presser spring 160 and the bottom surface 20b of the upper half 20 and the anchoring of the anchoring bent portion 162a of the reel presser spring 160 by the anchor projection 168a in the reel presser spring insertion portion 166.

Also, according to this embodiment, it is possible to assemble or disassemble the reel presser spring with an efficiency as high as or higher than that in the case of fixing the reel presser spring to the upper half by welding, caulking, adhesion or the like and this change of the fixing method does not adversely affect the basic performance of the magnetic tape cassette.

Figure 13:
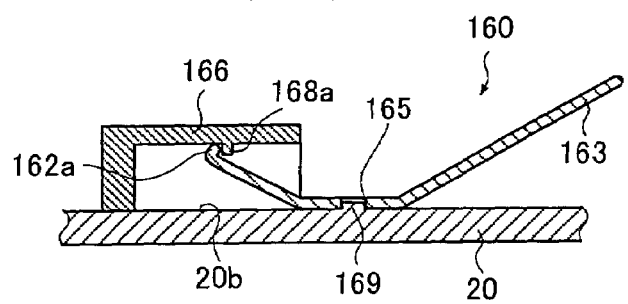
FIG. 13 is a partially cross-sectional view of the vicinity of a reel presser spring insertion portion on an inner surface of an upper half of a magnetic tape cassette according to another embodiment of the present invention.

FIG. 13 shows a partial improvement to the embodiment shown in FIG. 12. The point different from the embodiment shown in FIG. 12 is that, in this embodiment, an anchor mechanism is provided on a contact surface between the reel presser spring 161 and the bottom surface 20b of the upper half 20. That is, in this embodiment, an anchor hole 165 and a projection 169 are provided in the reel presser spring 161 and on the bottom surface 20b of the upper half 20, respectively.

In accordance with this embodiment, with the above-described structure, in addition to the anchoring force, the anchoring force caused by the anchor hole 165 provided in the reel presser spring 161 and the projection 169 provided on the bottom surface 20b of the upper half 20 work to thereby make it possible to obtain an effect of further enhancing the stability of both components after the anchoring.

Figure 14:
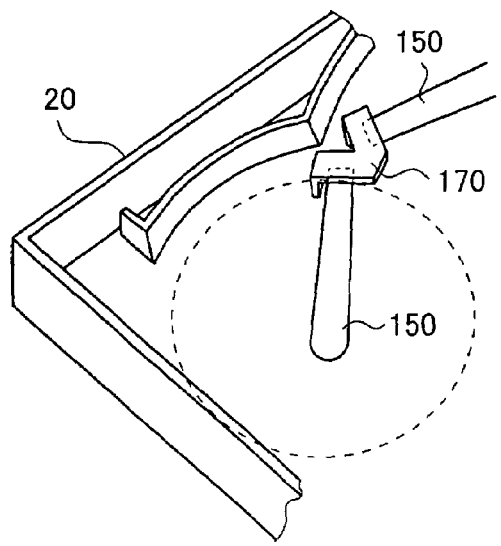
FIG. 14 is a partially perspective view of an inner surface of an upper half of a magnetic tape cassette according to another embodiment of the present invention.

FIG. 14 shows still another embodiment of the present embodiment mode. FIG. 14 is a partially enlarged perspective view of an inner surface of an upper half of a magnetic tape cassette according to this embodiment with the upper half being turned over. Incidentally, also here, only the main points will be described.

In the embodiment shown in FIG. 14, the reel presser spring anchor mechanism as described above is provided at a position close to both reels. It is possible to suitably use a reel presser spring insertion portion 170 constituting the anchor portion as shown in each of the foregoing embodiments. Incidentally, although the reel presser spring 150 is used in the example shown, any reel presser spring in accordance with each of the embodiments may be used for the reel presser spring insertion portion 170.

Also, according to this embodiment, it is possible to assemble or disassemble the reel presser spring with an efficiency as high as or higher than that in the case of fixing the reel presser spring to the upper half by welding, caulking, adhesion or the like, and this change of the fixing method does not adversely affect the basic performance of the magnetic tape cassette.

Figure 15:
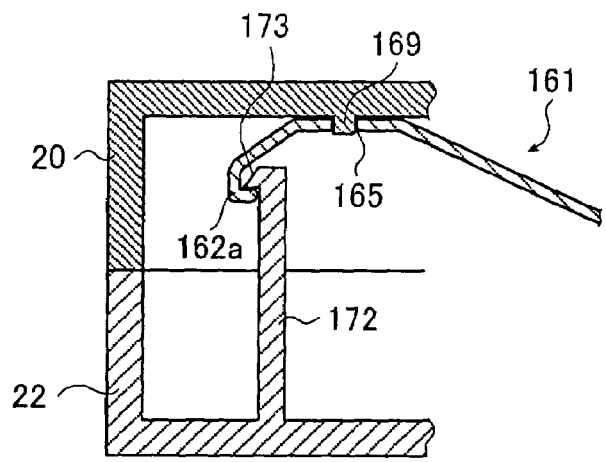
FIG. 15 is a partially cross-sectional view showing a primary part of a magnetic tape cassette according to another embodiment of the present invention.

FIG. 15 is an enlarged cross-sectional view showing a primary part of a magnetic tape cassette representing still another embodiment of this embodiment mode. According to this embodiment, a reel presser spring 161 having a hole 165 into which a projection 169 provided on the upper half 20 is fitted is anchored at an anchor claw 173 at a tip end of an anchor member 172 provided on the lower half 22 so that the reel presser spring 161 may be assembled to or disassembled from the upper half 20 without using any special tool.

In this embodiment, in order to anchor the reel presser spring 161, the anchor member 172 provided on the lower half 22 is used but the anchor member 172 can be functionally used just in the same manner as those in the other embodiments.

According to the first aspect of the present invention described above, it is possible to simply and completely separate and collect the reel presser spring from the case body, for example, the upper half without destruction only by disassembling the case body of the recording media cartridge or to easily disassemble and collect the reel presser spring in the reusable condition without any deformation.

A second aspect of the present invention will now be described with reference to FIG. 16.

Figure 16:
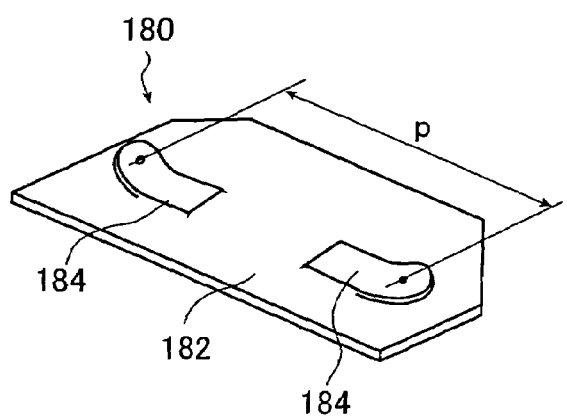
FIG. 16 is a perspective view showing the detail of a transparent window portion of a magnetic tape cassette according to one embodiment mode of a second aspect of the present invention.

FIG. 16 is a perspective view showing a transparent window portion of an upper half of a magnetic tape cassette according to one embodiment mode of the second aspect of the present invention with the upper half being turned over. Incidentally, also in the following description, only the main points will be described while omitting the general structure of the magnetic tape cassette described above.

A transparent window member 180 shown in FIG. 16 is the transparent window member used in the transparent window 20a shown in FIG. 33. A leaf-shaped reel presser spring is formed integrally with this transparent window member 180. Upon forming the window member 180, the most suitable plastics are selected and used for forming a transparent window body portion 182 and reel presser spring portions 184, respectively.

Also, p in FIG. 16 denotes the distance between the reel presser position centers of the respective reel presser spring portions 184 of the transparent window member 180. This distance p is the distance between the centers of the two tape reels 24, 24 of the magnetic tape cassette.

The shape of the reel presser spring portions 184 of the above-described transparent window member 180 may be the same as a dimension of a conventional metal-made leaf spring as a whole. However, a thickness thereof may be suitably modified (changed) according to the difference in elasticity between the metal-made leaf spring and the plastic-made spring.

According to the above-described embodiment, it is possible to assemble or disassemble the reel presser spring with an efficiency as high as or higher than that in the case of fixing the reel presser spring to the upper half by welding, caulking, adhesion or the like, and this change of the fixing method does not adversely affect the basic performance of the magnetic tape cassette.

That is, in the magnetic tape cassette into which the transparent window member 180 according to this embodiment mode is incorporated, since the number of the parts to be used is decreased in the process of assembling the cassette, the number of steps of assembling is decreased and in addition, not only is it possible to manage and reduce the cost of the parts but also it is possible to obtain a great economical effect of completely dispensing with the conventional necessity to further destroy the welded portion for the window part and the reel presser spring when the window is disassembled.

Also, for instance, coupling of a separately formed reel presser spring to the above-described transparent window member by welding, adhesion with adhesives or caulking is included in a basic concept of the present invention, i.e., a concept that the transparent window member and the reel presser spring are made of materials that exclude the necessity of sorting operation.

That is, according to the second aspect of the present invention, since it is possible to change the material of the reel presser spring to the material that does not need the sorting operation, it is possible to collect and reuse the cassette without separating the reel presser spring.

A first embodiment mode of a third aspect of the present invention will now be described with reference to FIGS. 17 to 20.

Figure 17:
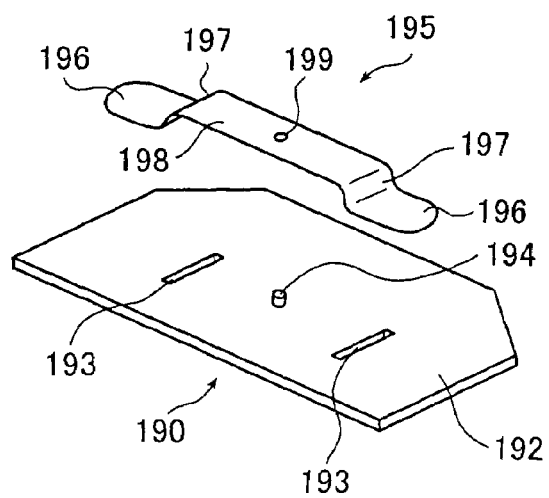
FIG. 17 is a perspective view showing the detail of a transparent window portion of a magnetic tape cassette in accordance with one embodiment of a first embodiment mode of a third aspect of the present invention.

FIG. 17 is a perspective view showing a transparent window portion of an upper half of a magnetic tape cassette according to one embodiment of the first embodiment mode of the third aspect of the present invention. Incidentally, also in the following description, only the main points will be described while omitting the general structure of the magnetic tape cassette described above.

A transparent window member 190 shown in FIG. 17 is a transparent window member used in the transparent window 20*a* shown in FIG. 33. This transparent window member 190 is formed by inserting a leaf-shaped reel presser spring into slits provided in the transparent window body portion. This insertion is performed by inserting the reel presser spring 195 separately formed of a metal plate into slits 193, 193 provided in the transparent window body portion 192 formed of plastic by a simple robot.

Also, in the embodiment shown in FIG. 17, the reel presser spring 195 has elastic portions 196, 196 on both sides, bent portions 197, 197 each bent at an obtuse angle inwardly with respect to the elastic portions 196, 196 and a flat portion 198 inside the bent portions 197, 197. An anchor hole 199 is formed in the middle of the flat portion 198. The anchor hole 199 is adapted to anchor the reel presser spring 195 by inserting a projection 194 provided midway between the slits 193, 193 on the transparent window body portion 192 of the transparent window member 190.

Incidentally, the shape of the reel presser spring 195 inserted and assembled into the above-described transparent window member 190 may be the same as the shape in which two conventional leaf springs are combined. However, it is possible to suitably modify (change) a specific shape or thickness thereof on the basis of the change of the length and the like.

Figure 18A:
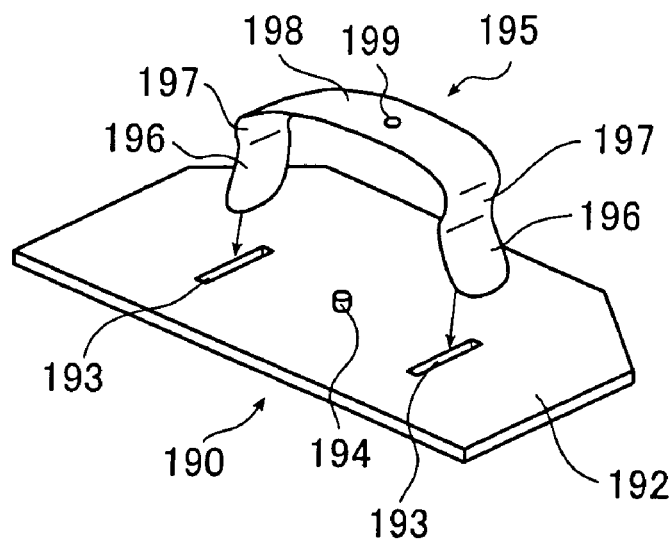
FIG. 18A and FIG. 18B are perspective views schematically showing the insertion order of the reel presser spring shown in FIG. 17, respectively.
Figure 18B:
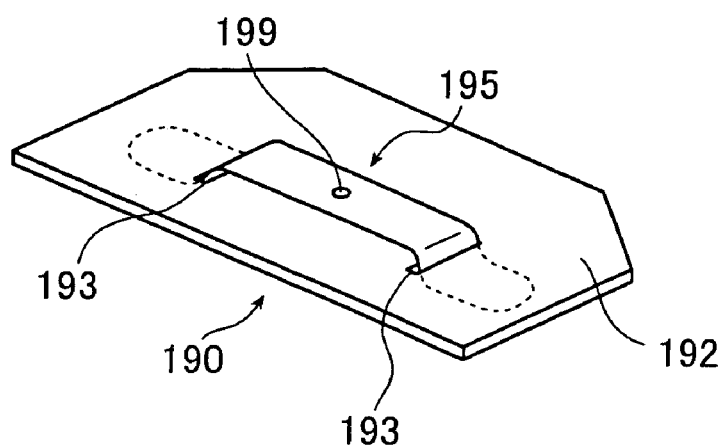

The steps for inserting this reel presser spring 195 are schematically shown in FIGS. 18A and 18B.

As shown in FIG. 18A, the reel presser spring 195 is clamped at both bent portions 197, 197, the flat portion 198 is curved to be shortened, and the elastic portions 196, 196 on both sides are inserted through the slits 193, 193 provided in the transparent window body portion 192, respectively. Thereafter, as shown in FIG. 18B, both bent portions 197, 197 are engaged with the slits 193, 193, respectively, and the projection 194 provided in the transparent window body portion 192 is inserted into the anchor hole 199 provided in the middle of the reel presser spring 195. As a result, the reel presser spring 195 may be fitted and fixed through the slits 193, 193 to the transparent window body portion 192. In order to more securely fix the reel presser spring 195 to the transparent window member 195, thereafter, the reel presser spring 195 may be anchored in the transparent window body portion 192 by caulking or welding the projection 194.

According to the above-described embodiment, it is possible to assemble or disassemble the reel presser spring with an efficiency as high as or higher than that in the case of fixing the reel presser spring to the upper half by welding, caulking, adhesion or the like, and this change of the fixing method does not adversely affect the basic performance of the magnetic tape cassette.

That is, in the magnetic tape cassette into which the transparent window member 190 according to this embodiment is incorporated, since the number of the parts to be used is decreased in the process of assembling the cassette, the number of steps of assembling is decreased and in addition, not only is it possible to manage and reduce the cost of the parts but also it is possible to obtain a large economical effect that the reel presser spring can be removed from the outside without separating and disassembling the upper and lower cassette cases while completely dispensing with the conventional necessity to further destroy the welded portion for the window part and the reel presser spring and sort them when the cassette is disassembled.

Figure 19:
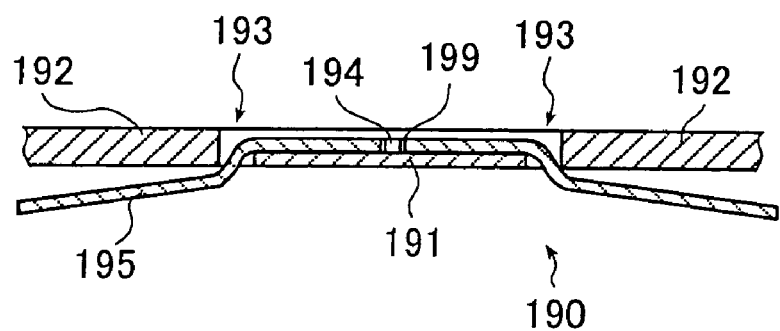
FIG. 19 is a partially cross-sectional view showing the insertion condition of the reel presser spring in the transparent window portion of an upper half of a magnetic tape cassette according to another embodiment of the present invention.

FIG. 19 is an enlarged cross-sectional view showing an inserted condition of a reel presser spring 195 in a transparent window portion of an upper half of a magnetic tape cassette in accordance with another embodiment of this embodiment mode. This embodiment is characterized in that a reel presser spring insertion portion vicinity 191 forms a recess in the transparent window member 190 of the transparent window 20*a* portion of the upper half 20 of the magnetic tape cassette.

In accordance with the structure according to this embodiment, since the reel presser spring insertion portion vicinity forms a recess in the transparent window 20*a* portion of the upper half 20, not only may the flatness of the transparent window 20*a* portion of the upper half 20 be enhanced after the insertion of the reel presser spring 195 to give a pleasing appearance but also it is possible to obtain the effect of surely retaining a label when the label relating to the product is adhered thereto.

Figure 20A:
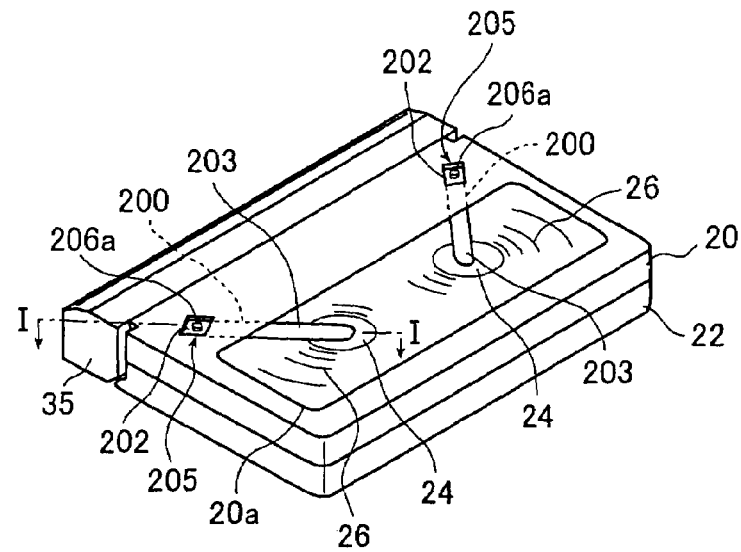
FIGS. 20A and 20B are partially cross-sectional views showing the insertion condition of the reel presser spring in the transparent window of an upper half of a magnetic tape cassette according to another embodiment of the present invention.
Figure 20B:
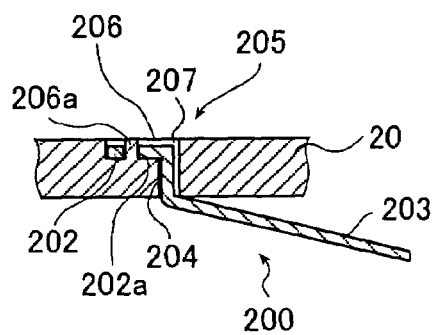

In the foregoing embodiment, the presser spring insertion portion is provided in the transparent window portion of the upper half of the magnetic tape case. The present invention is not limited to this arrangement. As shown in FIGS. 20A and 20B, the presser spring insertion portion may be formed in any other portion than the transparent window.

FIG. 20A is a perspective view showing an outer appearance of a magnetic tape cassette according to another embodiment of this embodiment mode. FIG. 20B is a cross-sectional view taken along the line I—I of FIG. 20A showing an inserted condition of a reel presser spring to an upper half of the magnetic tape cassette shown in FIG. 20A.

As shown in those drawings, in this embodiment, a reel presser spring insertion portion 206 into which a reel presser spring 200 extending to the transparent window is to be inserted is provided in a predetermined position of a portion other than the transparent window 20a on the surface of the upper half 20 of the case body 11 of the magnetic tape cassette, and the form of the insertion portion 206 is a characterizing feature.

That is, in this embodiment, the reel presser spring 200 is formed to have a support end 202, an elastic portion 203 slanted with respect to the support end 202 and a bent joint portion 204 bent at two positions for connecting the support end 202 to the elastic portion 203, a reel presser spring insertion portion 205 having a recess portion 206 provided on an outer surface side of the upper half 20 for embedding and engaging with the support end 202 of the reel presser spring 200 and a through-hole 207 in communication with this recess portion 206 and into which the support end 202 may be inserted inwardly from the recess portion 206 on the outer surface side of the upper half 20 is formed, and furthermore, a projection 206a provided in the recess portion 206 of the reel presser spring insertion portion 205 is anchored in an anchor hole 202a provided at the support end 202 of the reel presser spring 200 to thereby assemble both components.

In this embodiment, when the reel presser spring 200 is once inserted into the insertion portion 205 and the upper half 20 in this condition is assembled with the lower half 22, the reel 24 is urged so that the reel presser spring 200 per se is urged in the direction opposite to the direction in which the spring 200 goes away from the insertion portion 205, thereby urging the reel stably.

Of course, in view of a safety aspect, the anchor hole may be provided at a rear end of the reel presser spring 200 (one end opposite to the portion at which the reel is urged) and the anchor projection provided on the upper half 20 may be anchored therein (the projection may be caulked or welded to anchor in the rear end of the reel presser spring 200). With such a structure, the reel presser spring can be disassembled substantially as readily as in the above case.

A second embodiment mode according to the third aspect of the present invention will now be described with reference to FIGS. 21 to 25.

Figure 21:
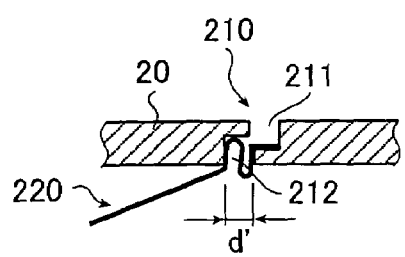
FIG. 21 is a partially cross-sectional view showing the vicinity of a reel presser spring insertion portion of a magnetic tape cassette in accordance with one embodiment of a second embodiment mode of the third aspect of the present invention.

FIG. 21 is a cross-sectional view of the above-described reel presser spring insertion portion vicinity of the magnetic tape cassette according to one embodiment of the second embodiment mode according to the third aspect of the present invention. Note that, here, the portion not directly related thereto is omitted. Also, in the following description, the general structure of the magnetic tape cassette described above is omitted and only the main points will be described.

In the embodiment shown in FIG. 21, the reel presser spring insertion portion 210 is formed at a predetermined position of the upper half 20 into a crank-shape so as to pass therethrough. That is, this reel presser spring insertion portion 210 is composed of recess portions 211 and 212, formed in a staggered manner, one of which faces the bottom surface (inside surface) and the other of which faces the outer surface (top surface) at the predetermined position of the upper half 20. Incidentally, an interval between these two recess portions 211 and 212 is structured in a communicable condition with a slight gap.

Figure 22:
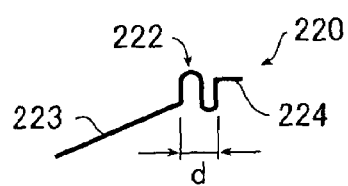
FIG. 22 is a diagram showing a natural condition of the reel presser spring shown in FIG. 21.

Also, in this embodiment, as shown in FIGS. 21 and 22, the leaf-shaped reel presser spring 220 is formed, for example, with an insertion portion having two hairpin portions, i.e., bent portions 222 bent in U-shape in opposite directions and a flat portion 224 at one end of the bent portions 222, and an elastic portion 223 provided at the other end of the bent portion 222. The bent portion 222 is machined to have dimensions that achieve a predetermined spring elasticity in the state in which the flat portion 224 of the reel presser spring 220 is brought into contact with the bottom surface of the recess portion 211 and the bent portions 222 are inserted into the reel presser spring insertion portion 210 and brought into area contact with both side surfaces of the recess portions 212.

FIG. 22 shows the reel presser spring 220 removed away from the above-described reel presser spring insertion portion 210.

As shown in FIG. 22, the bent portions 222 which are removed from the reel presser spring insertion portion 210 and which are included in the insertion portion of the reel presser spring 220 to be inserted into the reel presser spring insertion portion 210 has a larger dimension than that in the state in which the bent portions are actually inserted into the reel presser spring insertion portion 210. That is, in this embodiment, the reel presser spring 220 in which the bent portions 222 have a dimension d (natural bent width) as shown in FIG. 22 is inserted into the reel presser spring insertion portion 210 in a form compressed to some extent (here with the bent width being compressed to d') as shown in FIG. 21, to thereby enhance the anchoring reliability.

Incidentally, here, the insertion portion of the reel presser spring 220 to be inserted into the reel presser spring insertion portion 210 is structured to have two hairpin bent portions 222. This shape per se is not specially limited. The reel presser spring 220 need only take a form achieving a predetermined spring elasticity when being inserted into the reel presser spring insertion portion 210.

Figure 23:
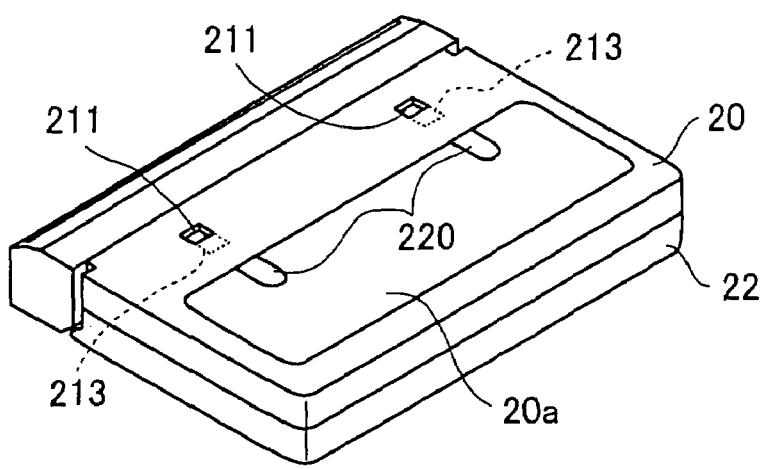
FIG. 23 is a schematic perspective view showing an outer appearance of the magnetic tape cassette shown in FIG. 21.

FIG. 23 is a perspective view showing an outer appearance of a magnetic tape cassette provided with a reel presser spring anchor mechanism in accordance with the embodiment with the above-described structure. As shown in FIG. 23, in the magnetic tape cassette according to this embodiment, the recess portion 211 of the reel presser spring insertion portion 210 appears on the top surface.

Incidentally, the recess portion 211 is preferably followed by a portion 213 indicated by dotted lines. This portion is an easy-disassembling structure portion for removing the reel presser spring 220 by lifting up and breaking this portion thus destroying the reel presser spring insertion portion 210, without separating or disassembling the upper and lower cassette cases. It is preferable to form this easy-disassembling structure portion 213 by a method of forming a groove on the front surface or back surface or grooves on both the top and back surfaces, for example. Also, this easy-disassembling structure portion 213 is provided with a dust proof function for preventing dust or the like from getting into the cassette.

In the magnetic tape cassette according to the above-described embodiment, not only may the reel presser spring 220 be removed by disassembling the upper and lower halves without using a special tool or the like but also only the reel presser spring may be removed by using a jig without disassembling the upper and lower halves, which has an effect of facilitating sorting and collection of the constituent materials.

Figure 24:
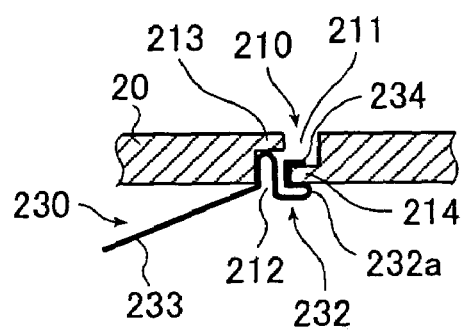
FIG. 24 is a partially cross-sectional view of the vicinity of a reel presser spring insertion portion of a magnetic tape cassette according to another embodiment of the present invention.

FIG. 24 is a cross-sectional view of the vicinity of the reel presser spring insertion portion of the magnetic tape cassette according to another embodiment of this embodiment mode. The point different from the embodiment mode shown in FIG. 21 is that the shape of a reel presser spring 230 is changed. In the reel presser spring 230 according to this embodiment mode, to two bent portions one of which comes in contact with the upper half 20 within a recess portion 212 of the reel presser spring insertion portion 210 is added a bent portion 232a in a direction perpendicular to the bent portions 232. The reel presser spring 230 is brought into contact with the inner surface of the upper half 20 facing the recess portion 212, whereby the effect of dust-proof in the portion (recess portion 212) of this reel presser spring insertion portion 210 is enhanced and at the same time, the reel presser spring 230 is clamped and more surely anchored at the portion of the convex portion 214 formed in the lower portion of the recess portion 211 of the upper half 20. Incidentally, the reel presser spring 230 has an elastic portion 233 on the side of the tip end of the bent portions 232 and a flat portion 234 on the rear end side of the bent portion 232a.

Figure 25:
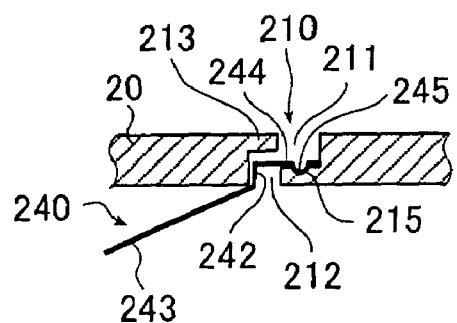
FIG. 25 is a partially cross-sectional view of the vicinity of a reel presser spring insertion portion of a magnetic tape cassette according to another embodiment of the present invention.

FIG. 25 is a cross-sectional view showing the vicinity of the reel presser spring insertion portion of the magnetic tape cassette in accordance with still another embodiment of this embodiment mode. The point different from the embodiments shown in FIGS. 21 and 24 is that the shape of a reel presser spring 240 is simplified. That is, in the reel presser spring 240 in accordance with this embodiment mode, the shape of the portion anchored in the recess portion 212 of the reel presser spring insertion portion 210 is changed to a simple shape with two bent points only so as to facilitate the manufacture of the reel presser spring. That is, the reel presser spring 240 is composed of an elastic portion 243, which is followed by a bent portion 242 in a crank shape bent in an acute angle and further bent at a right angle, which is then followed by a flat portion 244.

Incidentally, in this embodiment, in order to securely anchor the reel presser spring 240, a recess portion 215 with which a projection 245 provided in the reel presser spring 240 engages is provided within the reel presser spring insertion portion 210, i.e., in the bottom portion of the recess portion 211 in the example shown. This is a simple structure which provides an effect of securely anchoring the reel presser spring 240 in the reel presser spring insertion portion 210.

Also in the magnetic tape cassette using the reel presser spring anchor mechanism according to the above-described embodiment, it is possible to remove the reel presser spring without any tool when disassembling the magnetic tape cassette and the effect of enabling correct sorting of materials is obtained.

A fourth aspect of the present invention will now be described with reference to FIGS. 26 to 31.

First of all, in a recording media cartridge (magnetic tape cassette) according to the fourth aspect of the present invention, tape reels received in a case body are urged toward the lower half by planer reel presser springs mounted on the outside of the case body. The reel presser spring has at one end an anchor end anchored on the outer surface of an upper half or a lower half and at the other end a reel urging end for urging the tape reel toward the lower half.

The anchor end may be anchored on the outer surface of the upper or lower half. The anchor end may be anchored at an anchor portion provided on the upper half or anchored at an anchor portion provided on the lower half.

Also, the reel urging end is inserted into the case body from a through-hole provided in the upper half and its tip end is brought into contact with an upper portion of the tape reel to thereby urge the tape reel toward the lower half. The through-hole may be provided in either of the side wall and the top plate of the upper half and is not specially limited.

In this aspect, the reel presser spring may be provided in any position on the outside of the case body if the reel urging end can urge the tape reel received in the case body toward the lower half in the selected position without hindering the function of the other members and parts of the magnetic tape cassette. The mounting place and the number of the springs to be mounted may be suitably determined in accordance with the positions, the number, the shape and the like of the tape reels to be received in the case body.

Figure 26:
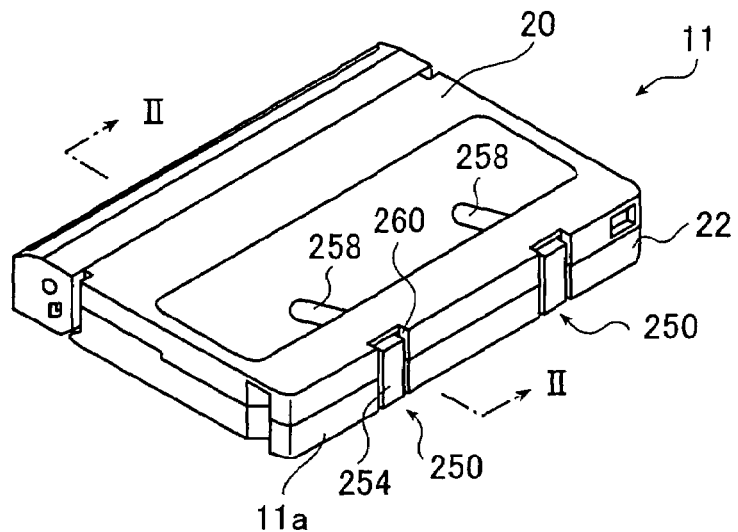
FIG. 26 is a perspective view showing a magnetic tape cassette according to one embodiment mode of a fourth aspect of the present invention.
Figure 27:
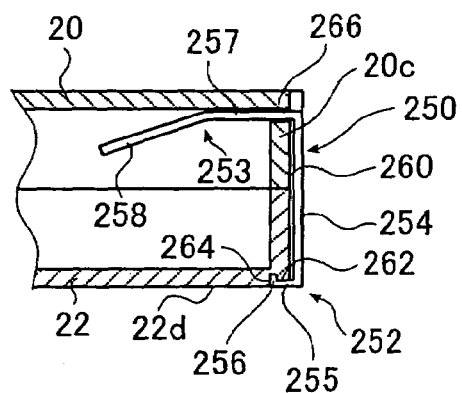
FIG. 27 is a cross-sectional view taken along a line II—II of the magnetic tape cassette shown in FIG. 26.

FIG. 26 is a perspective view illustrating a two-reel type magnetic tape cassette as one structural example of a recording media cartridge according to this aspect and FIG. 27 is a cross-sectional view taken along the line II—II.

In the two-reel type magnetic tape cassette shown in FIG. 26, reel presser springs 250 are mounted at two positions of the back surface side wall 11a of the case body 11 composed of the upper half 20 and the lower half 22.

Figure 28:
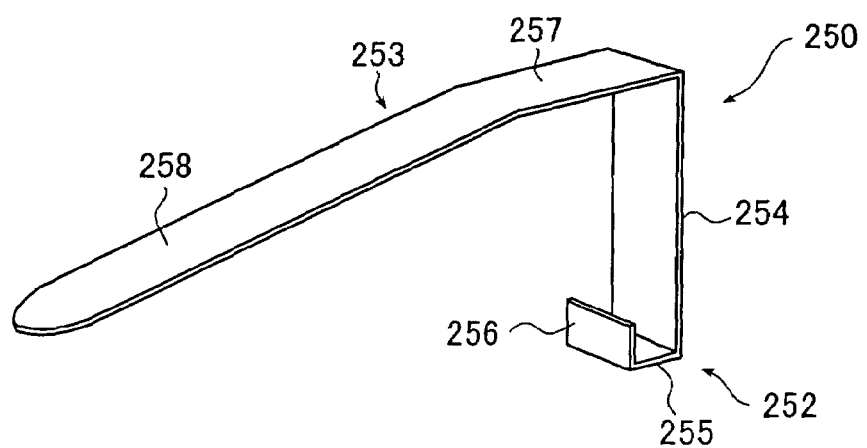
FIG. 28 is a perspective view of one structural example of the reel presser spring shown in FIG. 26.

As shown in FIG. 28, the reel presser spring 250 has at one end an anchor end 252 anchored on the outer surface of the lower half 22 and at the other end a reel urging end 253 inserted into the case body 11 for urging toward the lower half 22 the tape reel (not shown) received in this case body 11.

As shown in FIG. 27, the anchor end 252 has a fitting arm portion 254 fitted in a mounting groove 260 integrally formed in the lower half 22 and the upper half 20, an engaging arm portion 255 bent from this fitting arm portion 254 to be fitted in a fitting and anchoring groove 262 formed in an outer lower surface 22d of the lower half 22 and an anchor claw 256 formed at a tip end of this engaging arm portion 255. The anchor claw 256 is meshed with a meshing groove portion 264 formed toward the interior of the lower half 22 from the lower surface 22d in the side end of the fitting and anchoring groove 262 of the lower half 22 so that the anchor end 252 of the reel presser spring 250 is anchored in the lower half 22.

On the other hand, the reel presser spring 250 has at the other end a reel urging end 253 having an arm portion 257 passing through a through-hole 266 provided in the side wall 20c of the upper half 20 and laterally provided along the inner surface of the upper half 20 and a tip end portion 258 bent and formed toward the lower half 3 from this arm portion 257. The tip end portion 258 of the reel urging end 253 is adapted to come in contact with the upper portion of the tape reel (not shown) received within the case body 11 to be bent and urge the tape reel toward the lower half 22 by means of the elasticity of the tip end portion 258.

Figure 29:
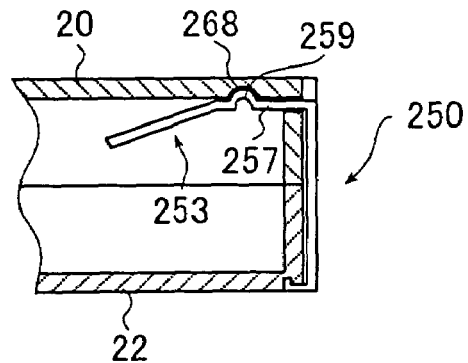
FIG. 29 is a partially cross-sectional view of another structural example of a magnetic tape cassette according to the present invention.

Also, in the reel presser spring 250 shown in FIG. 26, it is possible to provide a convex portion 259 on the arm portion 257 of the reel urging end 253 and to engage this convex portion 259 with a recess portion 268 formed in the inner surface of the upper half 20 as shown in FIG. 29. This is effective for suppressing the loose movement of the reel urging end 253 of the reel presser spring 250 within the case body 11 and urging the tape reel stably.

Figure 30:
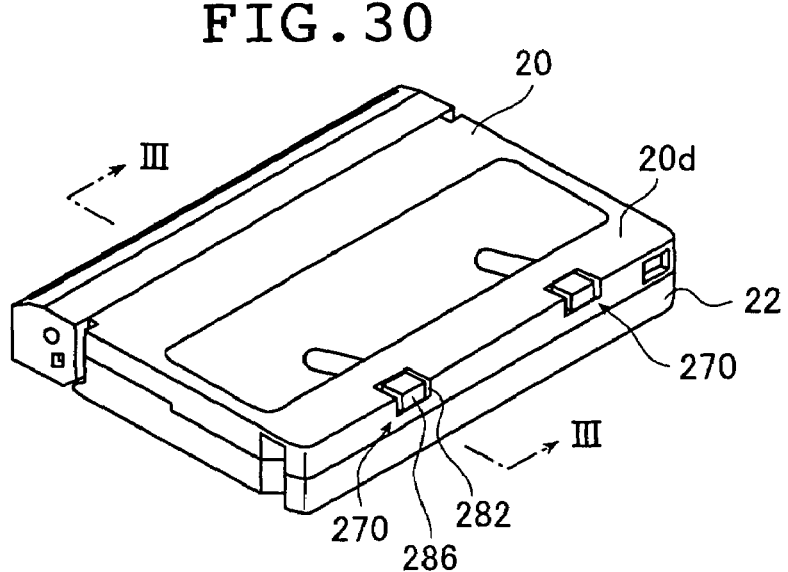
FIG. 30 is a perspective view of another structural example of a magnetic tape cassette according to the present invention.
Figure 31:
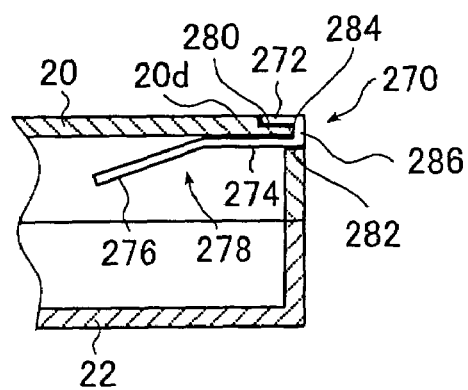
FIG. 31 is a cross-sectional view taken along a line III—III of the magnetic tape cassette shown in FIG. 30.

Furthermore, FIG. 30 is an overview of another structural example according to this aspect. FIG. 31 is a cross-sectional view taken along the line III—III of FIG. 30. As shown in these drawings, a reel presser spring 270 to be mounted on the outside of the case body 11 composed of the upper half 20 and the lower half 22 has at one end an anchor end 272 fitted and anchored in a fitting and anchoring groove 280 formed in a upper plate 20d of the upper half 20 and at the other end a reel urging end 278 composed of an arm portion 274 passing through a through-hole 282 provided in the side wall 20c of the upper half 20 and laterally provided along the inner surface of the upper half and a tip end portion 276 bent and formed toward the lower half 22 from this arm portion 274. This anchor end 272 and the reel urging end 278 are connected to each other through a fitting arm portion 286 fitted in a mounting groove 284 laterally formed in the side wall 20c of the upper half 20.

In the magnetic tape cassette shown in FIGS. 30 and 31, the anchor end 272 is anchored in the fitting and anchoring groove 280 provided in the upper plate 20d of the upper half 20 so that the reel presser spring 270 is anchored in the upper half 20. Also, the tip end portion 276 bent toward the lower half 22 is brought into contact with the top portion of the tape reel so that the reel urging end 278 urges the tape reel toward the lower half 22 with the elasticity of the bent portion.

When the magnetic tape cassette with such a structure is to be disassembled, the reel urging end 253 or 278 composed of the arm portion 257 or 274 and the tip end portion 258 or 276 is drawn through the through-hole 266 or 282 provided in the upper half 20 and the anchoring of the anchor end 252 or 272 in the lower half 22 or the upper half 20 is released, whereby the reel presser spring 250 or 270 can be removed from the case body 11.

As described above, in the magnetic tape cassettes shown in FIGS. 26 to 28 and FIGS. 30 and 31, it is possible to readily remove the reel presser spring without disassembling the case body. For this reason, these magnetic tape cassettes are advantageous in the case where the constituent materials are separated into the resin material and the metal material and are collected for each material.

A fifth aspect of the present invention will now be described with reference to FIG. 32.

Figure 32:
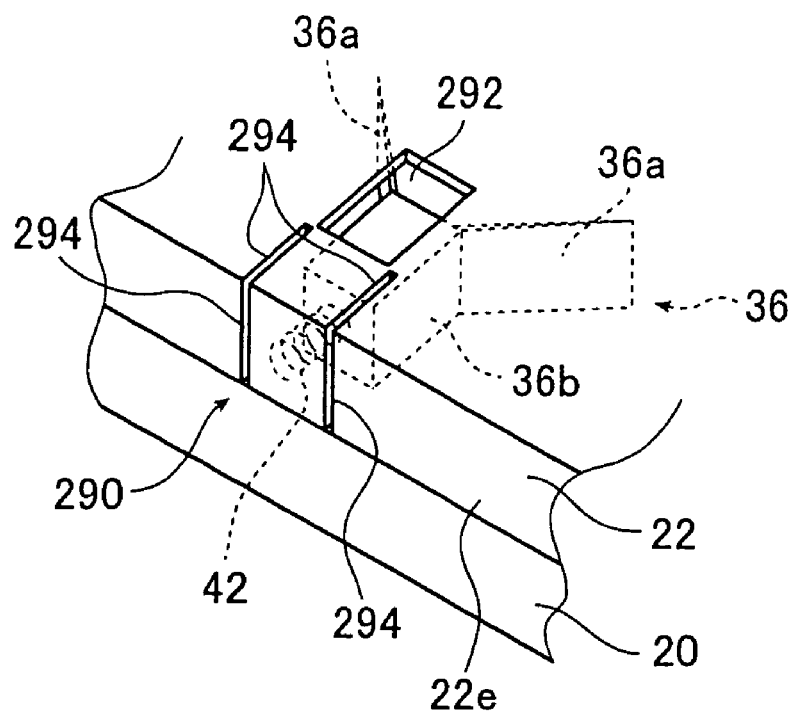
FIG. 32 is a partially enlarged perspective view of the vicinity of a reel lock member receiving portion of a magnetic tape cassette in accordance with one embodiment mode of a fifth aspect of the present invention.
Figure 34:
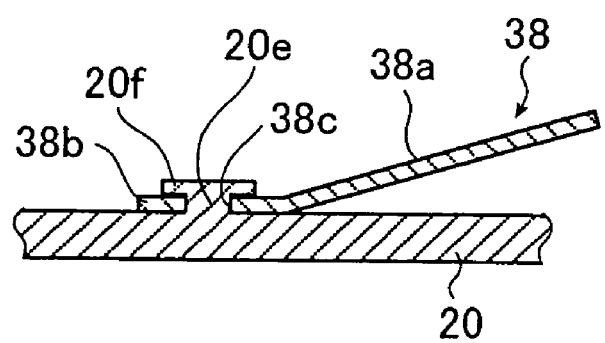
FIG. 34 is a partially cross-sectional view showing a mounting structure to an upper half of a reel presser spring of the magnetic tape cassette shown in FIG. 33.

FIG. 32 is an enlarged perspective view of the vicinity of a reel lock member receiving portion of a magnetic tape cassette in accordance with one embodiment of the fifth aspect of the present invention as viewed from the lower surface side of the lower half. Incidentally, here, the portion not directly related is omitted. Also, in the following description, the general structure of the magnetic tape cassette described above is omitted and only the main points will be described.

In FIG. 32, the portion indicated by reference numeral 290 is a reel lock member receiving portion and is structured so that the reel lock member 36 shown in FIG. 33 is guided and slid between two ribs (indicated by reference numeral 43 in FIG. 33) provided in the bottom surface (inner surface) 22a of the lower half 22. Then, the reel anchor arm 36a of this reel lock member 36 is urged toward engaging teeth 24d formed on an outer circumference of the lower flange 24c of each tape reel 24, 24 by a compression coil spring 42.

Also, the above-described compression coil spring 42 is received within the reel lock member receiving portion 290 together with the reel lock member 36. Conventionally, in order to remove this compression coil spring 42, it was necessary to disassemble (or dismount) at least the upper and lower halves 20 and 22 of the magnetic tape cassette and, in this condition, to remove the compression coil spring 42.

However, since it is troublesome and not good to perform this operation, i.e., the disassembling (dismounting) of the upper and lower halves 20 and 22 only in order to remove the compression coil spring 42, in this embodiment mode, as shown in FIG. 32, at least the side of the lower half 22 of the reel lock member receiving portion 290 may readily be destroyed whereby it is possible to remove the compression coil spring 42 by only one destroying operation.

More specifically, here, thin groove portions 294, 294 leading to an opening portion 292 of the above-described reel lock member receiving portion 290 are provided in the bottom surface 22a and the side surface 22e of the lower half 22 of the reel lock member receiving portion 290. A tip end of a tool such as a driver is inserted through the opening portion 292 and a part of the lower half 22 is destroyed along the thin groove portions 294, 294 whereby the compression coil spring 42 is removed from this destroyed portion.

Incidentally, here, the above-described thin groove portions 294, 294 are provided only on the outer surface of the side surface 22e and the bottom surface 22a of the lower half 22 but these may be provided on the inner surface of the lower half 22 or also may be provided on both the inner surface and the outer surface.

According to the above-described embodiment mode, it is possible to remove the compression coil spring 42 by one operation only by destroying a small part (part of the lower half here) of the magnetic tape cassette. There is no fear that due to this, the assembling efficiency of the magnetic tape cassette would be degraded. Also, the change of the structure does not adversely affect the basic performance of the magnetic tape cassette.

That is, with respect to taking the thin groove portions for parts around the reel lock member receiving portion in accordance with this embodiment mode, although it is necessary to partially change the design of the molding dies of the cassette case, there is no change in the actual molding process from the conventional process and it is possible to realize this structure only by taking over the conventional process without any change.

As described above, according to the third to fifth aspects of the present invention, it is possible to easily separate and collect the reel presser spring from the case body, for example, the upper half or to easily separate and collect the reel lock spring from the case body, for example, the lower half without disassembling the case body of the recording media cartridge.

As described above in detail, according to the present invention, particularly according to the first aspect, the above-described structure is adopted, whereby it is possible to mount the leaf-shaped reel presser spring onto the upper half with ease without using any special jig or parts or without using any method such as welding, caulking or adhesion. This has a superior assembling property for assembling.

Also, according to the present invention, in the recording media cartridge such as the assembled magnetic tape cassette, the reel presser spring may sufficiently perform the function that is needed for the leaf spring, and at the same time, it is possible to easily detach the reel presser spring from the upper half with one operation under the condition that the reel presser spring per se may be reused without any deformation and without damaging the structural parts and members of the recording media cartridge such as a case body, particularly, the upper half or the like upon disassembling the recording media cartridge.

Furthermore, in the case of the reel presser spring mounted on the upper half by the conventional welding, caulking, adhesion or the like, the part of the resin material of the upper half was adhered to the leaf spring when the leaf spring was removed. However, in the recording media cartridge according to the present invention, in the case where the reel presser spring is removed, it is possible to completely separate the reel presser spring solely from the upper half.

For this reason, according to the present invention, in the case where the material is sorted and discarded, or in the case where each part or member is to be reused by disassembling the rejected product from the manufacturing process, when the disassembling of the recording media cartridge is required, it is possible to readily disassemble and collect the reel presser spring under the reusable condition without any deformation.

As described above in detail, according to the present invention, particularly according to the first to third aspects, it is possible to attain a remarkable effect of realizing the recording media cartridge by eliminating welding such as ultrasonic welding or thermal welding, caulking, adhesion or the like used for mounting the reel presser spring to the upper half to thereby reduce the impact on the environment.

More specifically, according to the present invention, as described above, in the case where welding, caulking, adhesion or the like that is used for mounting the reel presser spring is eliminated, it is possible to effectively assemble and disassemble the spring with an efficiency as high as or higher than that of the case where the fixing is performed by welding, caulking, adhesion or the like, and also it is possible to attain a remarkable effect of realizing the recording media cartridge in which the change in the fixing method does not adversely affect the basic performance of the recording media cartridge.

Also, as described above in detail, according to the present invention, particularly to the third aspect, the reel presser spring formed with the insertion portion having at least two bent portions is inserted into the reel presser spring insertion portion provided in the upper half of the recording media cartridge so that the reel presser spring is anchored in the upper half. It is therefore possible to attain a remarkable effect of realizing the recording media cartridge in which the reel presser spring may readily be removed.

Also, as described above in detail, according to the present invention, particularly according to the fourth aspect, it is possible to readily remove the reel presser spring to the outside without disassembling the case body. For this reason, the present invention is effective when the constituent materials of the recording media cartridge such as the magnetic tape cassette are separated into the resin material and the metal material and are collected for each material.

Also, as described above in detail, according to the present invention, particularly according to the fifth aspect, easy-to-destroy thin groove portions are formed at least on the outer wall of the lower case of the reel lock member receiving portion of the recording media cartridge. It is therefore possible to attain a remarkable effect of realizing the recording media cartridge in which the compression coil spring for urging the reel lock member may readily be removed.

With respect to the various embodiment modes of the above-described respective aspects, the recording media cartridge according to the present invention has been described on the basis of the various embodiments. Any of these embodiments shows an example of the present invention. The present invention is not limited thereto. Of course, suitable modification or improvement can be made within the scope without changing the spirit of the present invention.

What is claimed is:

1. A recording media cartridge comprising:

a case body provided with an upper half and a lower half coupled with each other in a face-to-face relationship;

a reel which is rotatably received in said case body and around which a recording medium is wound;

a plate type reel presser spring having two end portions thereof, wherein said reel presser spring is supported on an inner surface of said upper half at only a proximal end portion and a distal end portion of said reel presser spring is operable to urge said reel toward said lower half; and a presser spring anchor portion formed on said inner surface, the presser spring anchor portion being operable to receive said reel presser spring, and wherein said reel presser spring is anchored in said presser spring anchor portion, wherein said presser spring anchor portion has an implanted portion implanted in said inner surface of said upper half so as to project from said inner surface of said upper half and an overhanging portion overhanging said inner surface by projecting from a distal end portion of said implanted portion so as to be parallel with said inner surface, wherein said reel presser spring comprising:

a U-shaped insertion anchor portion being said proximal end portion, said U-shaped insertion anchor portion comprising a support piece portion directly contacting said inner surface of said upper half facing said overhanging portion of said presser spring anchor portion and an open piece portion being parallel to said support piece portion and brought into elastic contact with said overhanging portion; and an elastic tongue portion forming said distal end portion, said elastic tongue portion extending directly from an end of said support piece portion of said U-shaped insertion anchor portion and inclined to a side of said open piece portion, wherein said U-shaped insertion anchor portion of said reel presser spring is inserted into and anchored in a space defined between said inner surface of said upper half and said overhanging portion, and wherein said reel presser spring is detachably mounted on the inner surface of said upper half so that said reel presser spring can be detached from the cartridge without damaging said case body, said reel presser spring and components of said recording media cartridge.

2. The recording media cartridge according to claim 1, wherein said reel presser spring, said case body and said components of said recording media cartridge can be disassembled without any damage and said reel presser spring is collected to be reused.

3. The recording media cartridge according to claim 1, wherein said reel presser spring has a bent tip portion extending from said elastic tongue portion and located at one end of said distal end portion and said bent tip portion, and said elastic tongue portion forms said distal end portion.

4. The recording media cartridge according to claim 1, wherein said presser spring anchor portion has guides or convex portions located on both sides of said presser spring anchor portion on said inner surface of said upper half and guiding said support piece portion of said U-shaped insertion anchor portion of said reel presser spring.

5. The recording media cartridge according to claim 1, wherein said reel presser spring has a convex portion on said open piece portion of said U-shaped insertion anchor portion.

6. The recording medium cartridge according to claim 1, wherein said presser spring anchor portion has an anchor hole in said overhanging portion capable of receiving a convex portion on said open piece portion.

7. The recording media cartridge according to claim 1, wherein said open piece portion of the U-shaped insertion anchor portion comprises a convex portion operable to pressingly attach to an anchor hole in the overhanging portion of the reel presser spring anchor portion.

8. The recording media cartridge according to claim 1,
wherein said reel presser spring has a convex portion on said open piece portion of said U-shaped insertion anchor portion,
wherein said presser spring anchor portion has an anchor hole capable of receiving said convex portion in said overhanging portion, and
wherein said convex portion is operable to pressingly attach to said anchor hole in said overhanging portion of said reel presser spring anchor portion.

9. The recording media cartridge according to claim 1, wherein said open piece portion is brought into elastic contact with an inner surface of said overhanging portion, where said inner surface of said overhanging portion opposes said inner surface of said upper half.

* * * * *